United States Patent

[11] 3,593,311

[72] Inventor Earl W. Caldwell
Mohawk, N.Y.

[21] Appl. No. 834,422
[22] Filed June 18, 1969
[45] Patented July 13, 1971

[73] Assignee Mohawk Data Sciences Corporation
Herkimer, N.Y.

[54] DATA RECORDER WITH SINGLE OPERATOR ENTRY-VERIFY CONTROL
20 Claims, 11 Drawing Figs.

[52] U.S. Cl. .......... 340/172.503
[51] Int. Cl. .......... G06f 11/00, G06f 11/08
[50] Field of Search .......... 340/172.5; 235/157

[56] References Cited
UNITED STATES PATENTS

| | | | |
|---|---|---|---|
| 3,071,753 | 1/1963 | Fritze et al. | 340/172.5 |
| 3,275,995 | 9/1966 | Hagopian | 340/172.5 |
| 3,296,370 | 1/1967 | Clark et al. | 340/172.5 |
| 3,335,407 | 8/1967 | Lange et al. | 340/172.5 |
| 3,403,225 | 9/1968 | Mislan et al. | 340/172.5 |

*Primary Examiner*—Gareth D. Shaw
*Attorneys*—Francis J. Thomas, Thomas C. Siekman, Richard H. Smith and Sughrue, Rothwell, Mion, Zinn and Macpeak

ABSTRACT: A key-to-magnetic tape data recorder is provided with control logic which requires the operator to key-verify each block of data immediately after it has been key-entered into a buffer memory and prior to its recordation on tape. During an entry cycle each character that is entered into the buffer memory is compared with the character it is replacing and a set error control (EC) bit is loaded into a control memory for each unequal comparison. EC bit data is inspected during the following verify cycle and if a set EC bit is encountered during a duplication operation it triggers an error alarm. The control logic further operates to require reverification of any data entered during a verify cycle. EC bits are forced set for any such verify-entered data and are employed at the culmination of the verify cycle to automatically restore the buffer memory accessing circuits to the first verify-entered data character, enabling rapid and simple reverification.

INVENTOR
EARL W. CALDWELL
BY, Richard H. Smith
ATTORNEY

DATA RECORDER WITH SINGLE OPERATOR ENTRY-VERIFY CONTROL

BACKGROUND OF THE INVENTION

This invention relates to keyboard-entry data recorders and, more particularly, to the type of key-entry recorders designed for direct generation of a high-speed computer input medium such as, for example, a magnetic tape or a magnetic disc.

Practically all data which is to be computer processed must be originally converted into computer-readable form through a manual key-entry operation. At the inception of the data processing industry and for many years thereafter the only equipment available for performing this operation was the keypunch machine. The traditional rules governing key-entry procedures, which were formulated by the originators of the keypunch, require that each punched card generated by the keypunch be subsequently verified, either in whole or in part, prior to being employed for computer input.

The verification operation is performed on a verifying machine which is essentially identical to the keypunch machine but which compares the data of each punched card with data being keyed by the verify operator. The verify operator thus performs a keying operation presumably identical to that previously performed by the keypunch operator and if there is any discrepancy the verification operation is halted and the verifying operator is presented with an error signal. If the operator discovers that the error was caused by an original keypunch mistake she must reject the card and take the time to punch a correct card or put the erroneous card aside to enable subsequent punching of a correct card. This can have the effect of delaying a whole processing run for a substantial period of time while new cards are being punched and verified. For many years, due to the dominance of the data processing industry by a single equipment manufacturer, keypunch machines and verifying machines were virtually the only means available for the preparation of basic computer input data. This system has proven in recent years to be an expensive and sometimes wasteful approach, principally because there has been a shift away from the punched card as the primary element of many data processing operations.

In 1965 the Mohawk Data Sciences Corporation introduced the key-to-magnetic tape Data Recorder which brought about substantial simplifications of the key entry and verification process for many applications. The MDS-type key-entry recorder is both a key-entry and a verifying machine, the difference being determined by the operation of a switch on the control panel, and thus the need for a separate group of entry machines and a separate group of verifying machines was eliminated. This feature was particularly appreciated by the small user who, having a need for only one or two entry machines, was not forced to purchase a separate verifying machine or group of verifying machines.

Users also greatly appreciated the Data Recorder's ability to directly generate a fully verified high-speed computer input medium. However, the MDS-type key-entry recorder continued to follow the tradition of the industry in requiring the performance of a completely independent verification operation, done by a separate verification operator who is usually a person having a higher than average degree of skill and experience in key-entry operation. Thus, to perform verification, each reel of tape, together with the batch of source documents it represents, is placed in a verification backlog and is taken up by a verification operator at a subsequent time. The MDS-type key-entry recorder therefore did not completely eliminate the old keypunch problems associated with distinguishing between verified and nonverified records and the problems associated with organizing and supervising the disposal of the separate verification workload. Further, the MDS-type machine was still subject to the problems associated with the attitude of indifference instilled in some entry operators due to their knowledge that their errors would be picked up and corrected later by the verifying operator. Nonetheless, the MDS-type key-entry recorder has greatly increased the overall throughput rate of the key-entry operation because of its ability to generate computer tape directly and since it incorporates features which greatly simplify and speed up the process of record correction during both the entry and verify cycles.

OBJECTS AND SUMMARY OF THE INVENTION

It is an object of the present invention to provide an improved key-entry recorder that further simplifies and speeds up the preparation of high speed, verified computer-readable input media.

Another object is to provide an improved key-entry recorder that increases the key-entry skill of the operator by providing her with an immediate indication of her errors through requiring her to verify each block of input data immediately after its entry and prior to its recordation on the computer readable medium.

Still another object is to provide an improved key-entry recorder which is particularly well suited to use in multiple keyboard entry systems wherein a group of keyboards serve a single recording device such as a magnetic tape drive.

Yet another object is to provide an improved key-entry recorder which requires immediate key-verification of each block of input data prior to recordation of the block on the computer readable medium and which permits the same range of duplication and skip procedures during a verify cycle which have hitherto been available in standard types of key-entry devices.

Still another object is to provide an improved key-entry recorder which automatically inhibits recordation on the computer readable record medium of any data entered during a verify cycle until after such data has been verified.

In accordance with the invention, there is provided a recorder having a buffer memory and a keyboard connected to permit manual input of data into the memory. Control means are provided for automatically switching the recorder into a verify cycle upon completion of an entry cycle. Further means are provided for comparing each character entered into the memory during an entry cycle with the character being replaced thereby. A special data bit is stored in a control memory for each unequal comparison. This enables automatic verification of data during any duplication operation that may be initiated during the verify cycle.

Further means are provided for entering a special data bit into the control memory for each character that is entered into the data memory (for purposes of correction) during a verify cycle. This enables the machine, upon completion of the verify cycle, to automatically access only the newly entered characters during the reverification cycle. Release of the data in memory to the recording unit cannot occur until all of the special data bits have been erased through successful comparisons.

These and other objects, features and advantages will be made apparent by the following detailed description of a preferred embodiment of the invention, the description being supplemented by drawings as follows:

GENERAL DESCRIPTION

Figure 1:
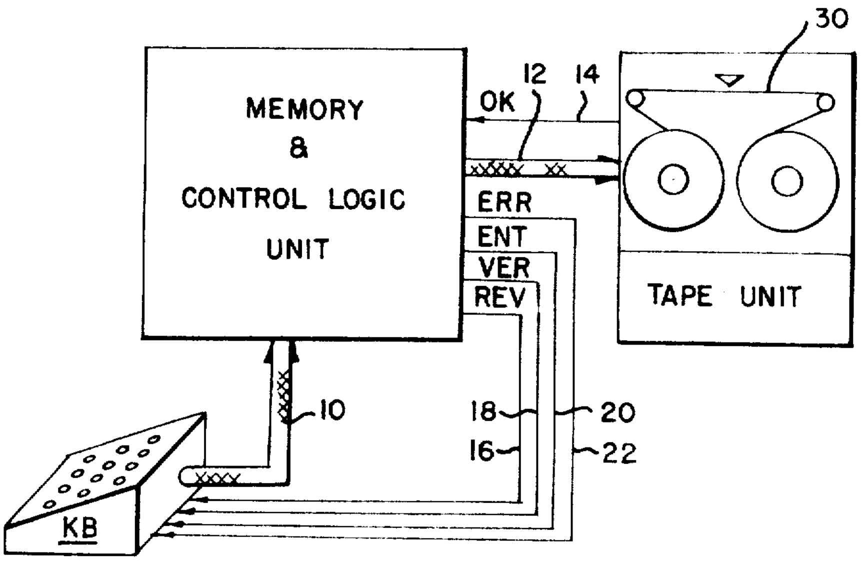
FIG. 1 is a schematic diagram showing the basic components of the recorder of the invention.

FIG. 1 illustrates one preferred embodiment of a key-entry recorder in accordance with the invention. The system has three principle components, a keyboard KB, a Memory and Control Logic Unit and a Tape Unit. A multiline cable 10 transmits various data and control signals from the keyboard to the control unit and a set of four control lines 16, 18, 20 and 22 transmit various control signals from the control unit to the keyboard. A signal REV is transmitted on line 16 to actuate an indicator light on the keyboard to signal the operator that the machine is in the reverify mode. A VER signal is transmitted on line 18 to actuate an indicator to show that the machine is in the verify mode. An ENT signal is transmitted on line 20 to actuate an entry indicator and an ERR signal is transmitted on line 22 to operate a keyboard error alarm and to condition the keyboard for operation in the error correction mode.

A multiline cable 12 interconnects the control unit with the tape unit and transmits data and control signals from the former to the latter while a single line 14 transmits the control signal OK from the tape unit to the control unit to signal the latter that the tape unit has completed its operation so that the control unit can initiate a new key entry cycle.

In a normal cycle the system executes the following sequence of operations: the operator manipulates keyboard KB to enter a block of data characters. These characters are temporarily stored in the memory and control unit and as soon as they have been entered the system shifts from the entry mode to the verify mode, the ENT signal terminating and the VER signal commencing. The operator then rekeys the data characters to verify the block. Each time a key is actuated, the data character it represents is compared with the corresponding data character stored in the memory. After the characters of the block have been verified, VER terminates and the operator initiates a tape cycle by actuating a release key. Signals representing the data characters stored in the buffer memory are then transmitted over cable 12 and recorded on a magnetic tape 30 at the tape unit. After recordation of the block is completed, the OK signal is transmitted to the control unit to restore the system to the entry mode in preparation for the next keying cycle.

ENTRY MODE

The description just given of a basic entry-verify cycle assumed that all characters of the data block were key-entered and key-verified by the operator. In such an operation the circuits of the memory and control logic unit are initially set to address the first character location of the memory and thereafter automatically step to the next location as each character is keyed.

In practice, the need for keying a full character block is infrequently encountered. Usually, some portion of the data block is entered through use of the well known key-entry functions of skip or dup. Either of these functions can be initiated manually from the keyboard or automatically through program control. In regard to the latter, the memory unit of the system is provided with a program data section having one character location for each character location in the working data section. The program memory is accessed concurrently with the data memory by the same addressing circuits. For the purposes of the present description, the program memory is capable of storing, in each location, data bits indicative of three different types of automatic functions, MSD (most significant digit), skip and dup. An MSD bit indicates that the corresponding character location of the data memory is the most significant position of a data field. A skip bit indicates that the corresponding position in the data memory together with all subsequent positions up to the next MSD position are to be skipped. A dup bit indicates that the corresponding position in the data memory together with all subsequent positions up the the next MSD position are to be duplicated. Of course, if there are no MSD positions following a position containing either a skip or a dup bit all of the remaining positions of the data block are either skipped or duped.

In executing a skip function, initiated either manually or under program control, the system inserts a space character in each data memory location passed during the skip. In executing a dup function, whether manually or automatically initiated, the system simply passes over and does not alter the contents of the affected locations in the data memory. As has been the long established practice in the key-entry art, the skip function is used when it is desired to leave character positions blank and the dup function is used when characters to be entered duplicate those in corresponding positions of the previously entered data block. Availability of the skip and dup functions to the operator of course rapidly speeds up the entry operation and because of this the functions are virtually mandatory features for any key-entry system. Other programmable functions such as left zero fill, alpha shift, etc. can be programmed into the system through the program memory but, not being relevant to a description of the present invention, explanation thereof is omitted.

In the entry mode, then, the operator merely keys in data in the positions where it is required. The remaining positions of the block are filled in with space characters or characters duplicated from the previous block under automatic program control or under manual control in response to actuation of either the skip or the dup key.

For purposes of error control in accordance with the invention, a special control memory, having a storage location for each storage location of the data memory, is included in the memory and control logic unit. In accordance with the principles of the invention, error control (EC) bits are entered into the control memory during the entry mode to indicate the state of comparison of each character entered into the data memory with respect to the character previously stored in the same memory position. Thus, when a character is entered from the keyboard during entry mode a "set" (1) EC bit is entered into the corresponding position of the control memory if the character is not identical to the character previously stored in the same data memory position. If the two characters are identical a "reset" (0) EC bit is entered into the control memory and if a set EC bit happens to be present in the control memory at the associated control memory location it is reset. During a skip operation in entry mode a set EC bit is entered into the control memory for each position passed that did not previously contain a space character. All other skipped positions have their EC bit location reset. In a dup operation during entry mode all EC bit locations corresponding to the duped positions are reset.

VERIFY MODE

As the operator rekeys the data during the verify mode, the system operating to compare each keyed character with the character stored in the relevant position of the data memory, any set EC bits present in the corresponding positions of the control memory are reset if the comparisons are equal and the addressing circuits move on to the next position to be verified. If a keyed character does not compare with a stored character, an EC bit is set for that position and the system presents the operator with an error alarm. This prevents the addressing circuits from advancing and throws the system into an error mode, described in detail subsequently, which requires the operator to retry the verification and, if necessary, to correct the data in memory.

In the verify mode the skip and dup functions are operable, as they were during entry, to allow the operator to skip over data positions containing blanks and to automatically advance past positions containing characters identical to those contained in the corresponding positions of the previous data block. In a dup operation during verify the positions in the control memory related to the data positions being duped are inspected for set EC bits and if a set EC bit is encountered the dup operation is immediately arrested without further advance of the memory addressing circuits and the operator is presented with the error alarm.

In a manually initiated skip operation during verify, the content of each memory position passed is compared with a space character and if an unequal comparison is encountered the skip operation is immediately terminated without further advance of the memory addressing circuit and the operator is presented with the error alarm. In a program initiated skip operation during verify, the contents of both the data memory and the control memory are ignored (verification being precluded) and the addressing circuits step past the memory positions until either an MSD program bit or the end of the record is encountered. During any skip operation in the verify mode any set EC bits present in the control memory for those positions passed over are reset.

ERROR CORRECTION DURING VERIFY MODE

As mentioned above, whenever an error condition occurs, the memory accessing circuits are halted at the position producing the error and the operator is presented with an error alarm. This disables the data keys and the skip and dup keys. To remove the error condition the operator must actuate an error release key, which releases the data keys for operation so that she can key in the character which she knows (having the original source document in front of her) should be in the error-producing memory position. This effects another comparison operation and if this time an equal condition is achieved the error condition is not triggered and the verification cycle can be continued in the normal manner. If an unequal comparison occurs the operator knows that the character stored in the memory is not correct. The unequal comparison reestablishes the error condition and memory advance is again blocked. The operator is then required to alter the data memory by keying in the correct character. This is done by again actuating the error release key and while the key is held depressed, by actuating a correction key. This temporarily restores the system to the entry mode to enable the operator to key-enter the correct character into the data memory. When the character is entered a set EC bit is forced into the related position of the control memory regardless of the state of comparison between the newly entered character and the previously stored character. Since during the correction entry the system is not in the verify mode, the error condition does not occur and upon completion of the correction entry the system automatically shifts back to the verify mode and verification is permitted to continue in the normal manner except that at the end of the verification sequence the release key is disabled and the transfer of the stored data block to the tape unit is prevented until the newly entered data is verified.

REVERIFICATION MODE

Any time the operator enters data into the memory when the system is operating in the verification mode such data must be verified by rekeying before it can be recorded on tape. Thus, in the system according to the invention, at the completion of any verification cycle during which new data was entered the addressing circuits are automatically stepped back to the memory position containing the first such newly entered character. The system recognizes the position of this character by searching for a set EC bit in the control memory. Operation then continues as in a normal verify mode with the operator rekeying the new data for comparison with the contents of the data memory. If each keying operation results in an equal comparison no error conditions occur and a tape release automatically occurs at the end of the reverification cycle. If any unequal comparisons occur during reverify, an error condition is initiated, just as in the verify mode, and if new data is entered during the reverify cycle, the release is again blocked and the system again requires reverification.

The only difference between the operation of the system in verify mode as compared to reverify mode is that during the latter the contents of the program memory are ignored, the skip key is blocked and the tape release is automatically triggered. During reverification, after the operator has key-verified the first newly entered character she actuates the dup key to cause the addressing circuits to automatically advance to the data position containing the next newly entered character (unless the new characters are adjacent to one another). If there is no second newly entered character, operation of the dup key automatically advances the addressing circuits to the end of the data block whereupon the release operation is triggered.

DETAILED DESCRIPTION

Definition of Circuit Symbols

Figure 4:
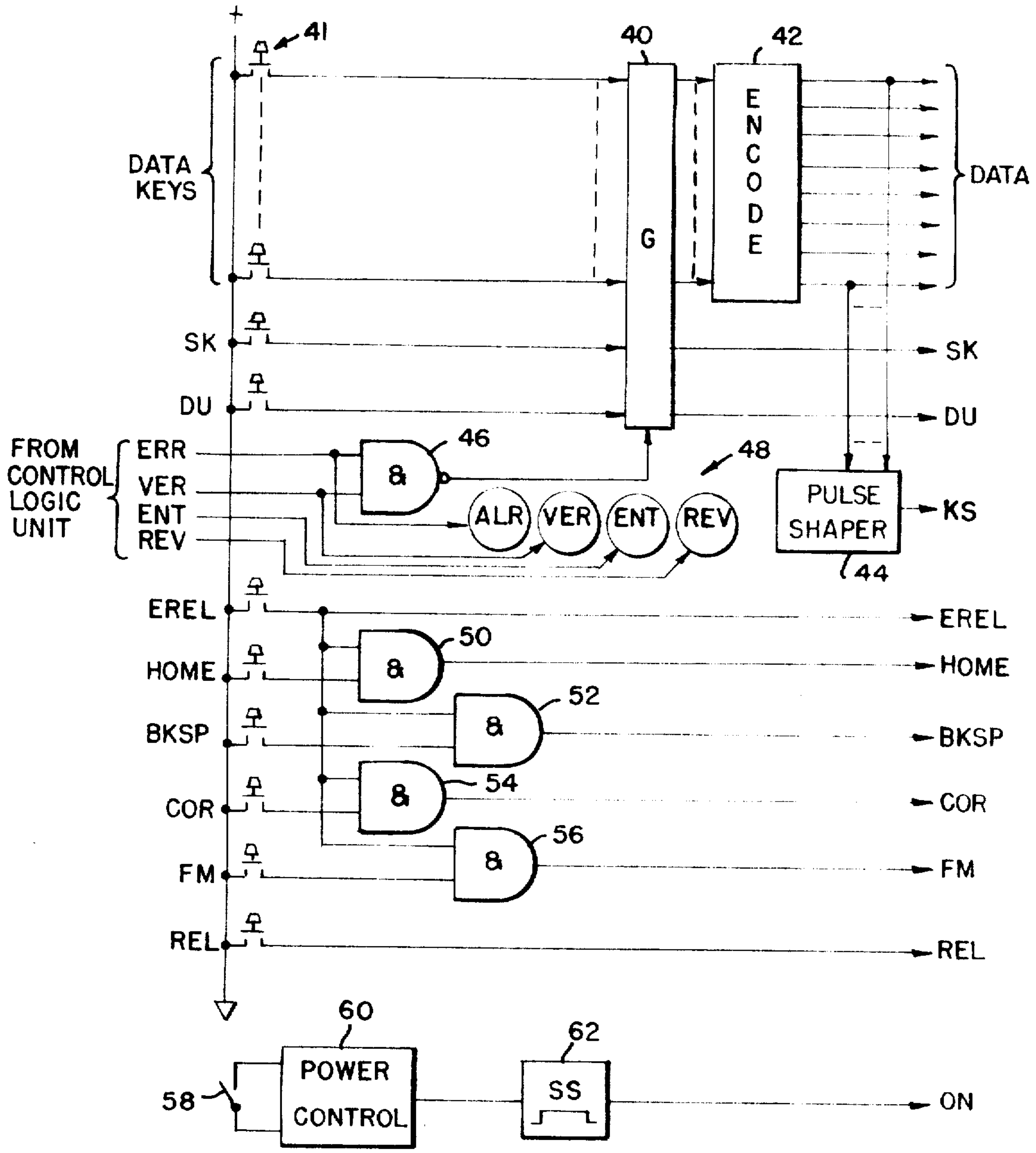
FIG. 4 is a schematic diagram showing the control circuits of the keyboard unit KB of FIG. 1.

Before proceeding with a detailed description of the preferred embodiment of the invention the meaning of the logic circuit symbols used in FIGS. 4 and 5 is given. It is to be understood that the logic schematics of FIGS. 4 and 5 operate, as is conventional, on a binary voltage level basis wherein the inputs to the circuits and the outputs therefrom always exist at either of two discreet voltage levels, the upper voltage level (H) of the system or the lower voltage level (L) of the system.

An AND circuit is represented by a D-shaped block containing an & symbol. The input lines are always connected to the straight side of the block and the output line is always connected to the curved side of the block. The function of this circuit is to provide an H output voltage only when all input lines exist at the H level. When a small circle appears at the point where the output line joins the block then the function of the circuit is to provide an L level output only when all inputs are at the H level.

An OR circuit is represented by an arrow-shaped block containing the symbol OR. Input lines are always connected to the concave side of the block and the output line is always connected to the point. The function of this circuit is to provide an H level output only when any one or more of the input lines is at the H level.

A flip-flop circuit is represented by a rectangular block containing the symbol FF. The inputs are labeled set (S) and reset (R) and the outputs are labeled 1 and 0. This circuit is bistable in nature and its outputs are always at opposite voltage levels. When an L to H voltage level transition is presented at the S input the 1 output goes to H and the 0 output goes to L unless the outputs are already in such a state in which case the output levels do not change. When an L to H transition is presented to the R input the 0 output goes to H and the 1 output goes to L unless the outputs already exist in such a state in which case there is no change in the output levels.

A single-shot multivibrator is represented by a rectangular block containing the symbol SS. The input line to the circuit is always connected to the left or bottom edge of the block and the output line is always connected to the right or top edge of the block. The function of this circuit is to generate an L to H to L square wave output pulse of fixed duration in response to an L to H transition occurring at the input. When a small circle appears at the point where the input line joins the block then the function of the circuit is to provide the square wave output pulse in response to an H to L transition at the input.

An inverter circuit is represented by a triangular block containing the symbol I and having a small circle at the point where the output line joins the block. The function of this circuit is to provide an output level which is always opposite to the input level.

A delay circuit is represented by an elongated oval-shaped block with a pair of stripes nearest the input end. The function of this circuit is to generate an output level which follows the input level but which changes state at some fixed period of time after the input changes state.

A gate circuit is a rectangular block containing the symbol G. Inputs into the gate circuit are identified by an arrowhead. The function of this circuit is to transfer the voltage levels on a plurality of input lines to an equal plurality of output lines whenever the gate control input line is at the H level. The latter line is a single input connected to one of the ends of the gate block. A gate circuit is usually made up of a plurality of AND circuits, one for each input line other than the gate control input. Each input into the gate is connected to the input of a different one of the ANDs and each output from the gate is taken from the output of a different one of the AND circuits. The gate control input line is connected to an input of all the ANDs.

Keyboard

The keyboard unit KB is shown in detail in FIG. 4. The keys are manually operable momentary contact switches 41. The usual number of data keys are provided for entering the numerals zero through nine, the letters of the alphabet, special symbols, etc. The output from each of the data keys is transferred through a gate circuit 40 into an encoding circuit 42. The latter has eight output lines which connect over the cable 10 with the memory control and logic unit. When no data key is actuated or when gate 40 is closed all eight outputs from the encoder are at L. When gate 40 is open and a data key is actuated the eight output lines exist at a unique combination of H and L levels representative of the particular key depressed.

In addition to the data keys there is a skip key SK, a dup key DU, an error release key EREL, a home key, a backspace key BKSP, a correction key COR, a field modify key FM and a release key REL. The skip and dup keys are connected through gate 40 to transmit SK and DU signals, respectively, to the control unit when gate 40 is open.

Figure 6:
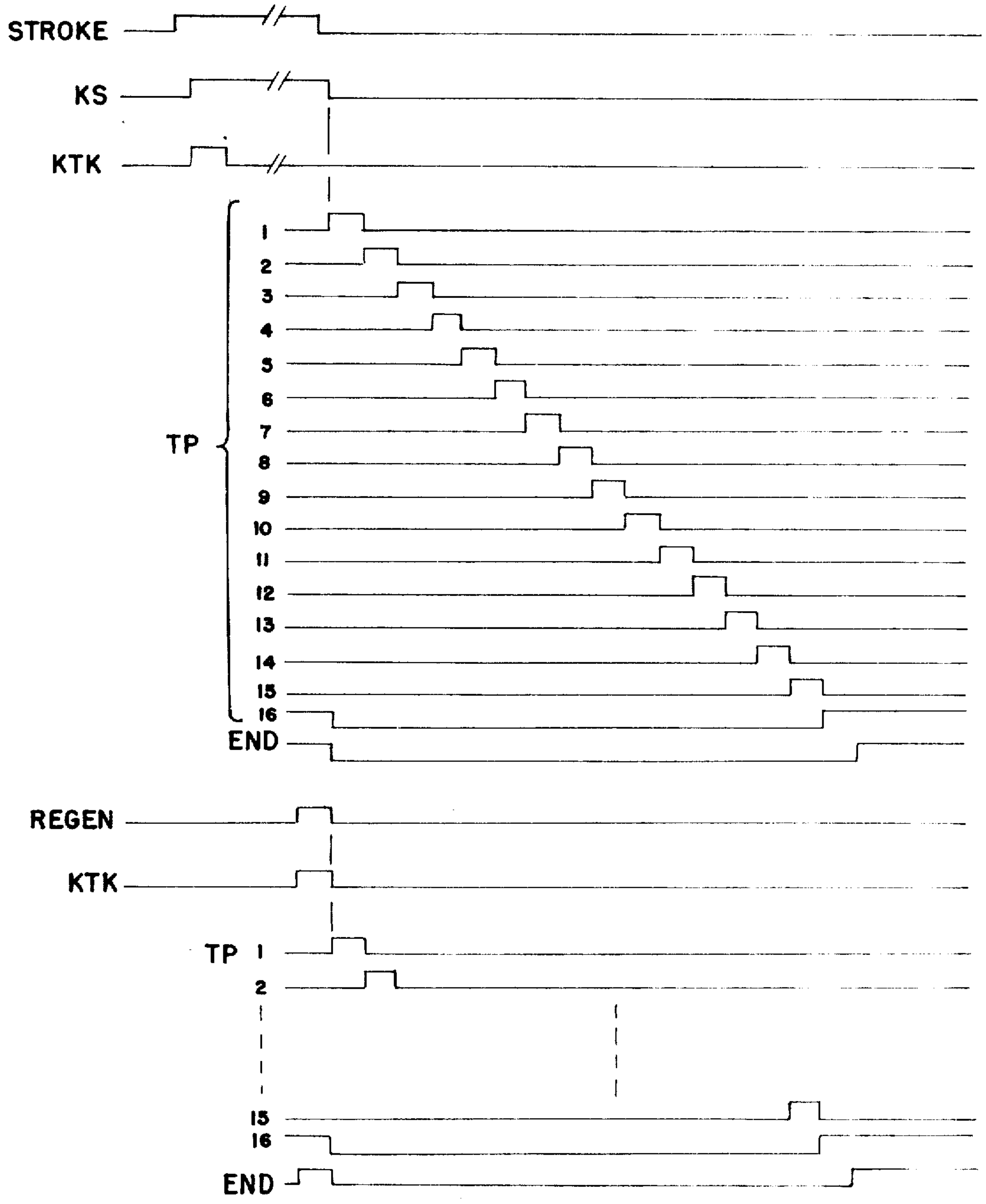
FIG. 6 is a waveform diagram showing the interrelation between various ones of the timing signals generated by the timing circuits of FIG. 5.

Each of the output lines from encoder 42 is connected to a pulse shaper circuit 44 which generates an output KS to the control unit. As shown in FIG. 6, the KS signal follows the shape of the signal produced by the keystroke but is offset in time therefrom by the operation of the circuit 44. The purpose of this is to remove the effects of switch contact bounce. KS thus comes up when any data key is operated (providing gate 40 is open).

Referring back to FIG. 4, the error release key, when actuated, generates an EREL signal which is transmitted to the control unit and which is also used to partially condition AND circuits 50, 52, 54 and 56. AND 50 thus generates a HOME signal when the error release and home keys are simultaneously depressed. Similarly, AND 52 generates a BKSP signal when the error release and backspace keys are simultaneously depressed, AND 54 generates a COR signal when the correction and error release keys are simultaneously depressed and AND 56 generates an FM signal when the error release and field modify keys are simultaneously depressed. The release key generates REL whenever it is actuated. The control signals EREL HOME, BKSP, COR, FM and REL are all transmitted to the control unit via the cable 10.

A single pole, single throw switch 58 is also provided at the keyboard to serve as the main on-off switch for the system. When switch 58 is closed, causing a power control circuit 60 to supply power to the system, a single-shot 62 generates an ON signal which is also transmitted to the control unit.

The ERR control signal which is received by the keyboard unit from the control unit partially conditions an AND circuit 46 and also actuates a visual and/or audio alarm ALR. The VER control signal received from the control unit is also connected to the input of AND 46 and to a verify mode indicator light 48. Thus, whenever the ERR and VER signals are simultaneously present, the output from AND 46 shifts low and thus closes Gate 40 to inhibit the transmission of any signals from the data skip or dup keys. The ENT signal operates an entry mode indicator light 48 and the REV signal operates a reverify mode indicator light 48. Thus, the operator is visually apprised at all times of the operational mode of the system by the lights 48.

In addition, the keyboard is provided with a display (not shown) controlled by the addressing circuits in the control unit to inform the operator of the particular character storage location in the memory which is being accessed at any given time. Such a display is particularly helpful to the operator in making error corrections when in the verify mode. While the detailed operations which are initiated by the depression of any of the keys 41 are described subsequently, the general function performed upon actuation of the keys 41 as follows:

Depression of any data key while the system is operating in entry mode transmits an 8-bit binary coded character to the control unit and triggers an entry cycle to cause the coded character to be entered into the data memory. Depression of any data key during operation of the system in the verify mode transmits a coded character to the control unit and triggers a comparison cycle wherein the character is compared with the character stored in a particular storage location of the memory.

Depression of either the skip or dup keys during either entry mode or verify mode triggers a skip or dup operation which continues until the beginning of a new data field is reached.

The error release key is effective only in the verify mode and operates to remove an error condition so that the operator may make a second attempt to verify the character which produced the error condition. This key also must be operated to effect data corrections.

The home key is effective in either the entry or verify mode and operates to restore the system to an initial condition by shifting into entry mode, restoring all the control circuits and forcing the memory addressing circuits into a condition where they are set to access storage location 1.

The backspace key operates during either entry or verification to decrement the memory addressing circuits one storage location toward location 1.

The correction key is effective only during verification to shift the system temporarily back to entry mode to allow entry of a single new character.

The field modify key operates during entry mode to automatically decrement the memory addressing circuits to the beginning of the data field. During verify, it has the same effect and additionally shifts the system temporarily out of the verify mode and into the entry mode and holds it there until the whole data field has been reentered.

The release key operates during entry or verify mode and has the same effect as operating the skip key with the additional effect that in the verify mode it automatically initiates a tape release cycle if the skip operation completes the verify cycle without the occurrence of an error condition.

Memory and Control Logic Unit

Figure 7:
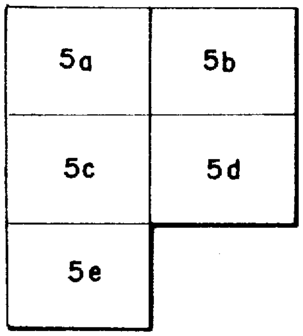
FIG. 7 is a diagram illustrating the manner in which the drawings of FIG. 5 are to be assembled for ease of reference.

The memory and control logic unit is illustrated in detail in FIGS. **5*a*, 5*b*, 5*c*, 5*d*, and 5*e*. For ease of reference it is recommended that the five sheets of drawing be assembled into a single sheet in the manner illustrated in FIG. 7. For further ease of reference each reference numeral used to identify a circuit component in FIG. 5** is provided with a prefix A through E to identify the particular sheet on which it appears.

A single magnetic core memory matrix B100 provides storage for the working data, the EC bits and the program data. The matrix B100 has 80 addressable storage locations each of which has eight bits of storage for one character of working data, one bit of storage for the EC bit data and three bits of storage for the program data. A set of addressing circuits B108 has 80 output lines numbered 1 through 80 each of which links a different one of the storage locations in matrix B100. The circuits B108 operate basically as a ring counter whereby only a single one of the output lines is active at any given time. The circuits B108 have an incrementing input INC, a decrementing input DEC and a homing input 81. Each output pulse generated by AND B110 feeds the INC input and advances the active output line by one position. Each BK 2 pulse fed to the DEC input backspaces the active output line one position. A ST pulse presented to the homing input forces the 81st and last output line to go active and restores the remaining 80 outputs to the inactive status, no matter what the previous status may have been. When the addressing circuits are in the initialized or home condition a high signal appears on output line 81 and a low signal on output line $\overline{81}$ due to the presence of an inverter B112. In all conditions of the addressing circuits other than the home condition output 81 is low and output $\overline{81}$ is high.

All bits of data are simultaneously and destructively read from an addressed storage location of matrix B100 by the application of a read pulse RD which is fed on a line linking all storage locations. Twelve data bits are thus presented in parallel on the 12 readout lines B101. Twelve sense amplifiers B012 simultaneously sample the condition of the readout lines in response to a strobe pulse STR which is generated an instant following the leading edge of RD (to allow for settling of the readout lines). The 12 outputs from the sense amplifiers are transmitted via a 12-line cable B104 to the inputs of a 12-stage transfer register A. In addition, the eight bits of data read from the working data section of the memory are transmitted in parallel through a gate B106 to the tape unit. Gate 106 opens in response to a TAPE control input.

The A register has three sections, A1, A2–1 and A2–2. Section A1 consists of eight bistable circuits for storing the bits of one character of working data, section A2–1 consists of a single bistable register for storing the EC bit data and section A2–2 consists of at least three bistable registers for storing the three bits of a program character. As soon as the output lines from sense amplifiers B102 go active in response to STR the data and program characters are automatically loaded into the A register. However, the EC bit data read from memory is presented to the A register on a line A83 via a pair of AND circuits A85 and A87. Thus, a set EC bit cannot be transferred into the A register at TP2 time by AND A85 unless the control signals DUP and VER are high. At TP10 time AND A87 loads the EC bit according to its face value. Before each data transfer operation into the A register a CLRA signal clears the register by setting each of its storage positions to the "zero" state whereby the register output lines are all low.

Data is written into memory matrix B100 by a set of write driver circuits B98 which operate in response to a WR signal to simultaneously store data bits in all 12 bit locations of the addressed storage location. Inputs to the driver circuits B98 are transferred either from the A register by a pair of gates B90 and B92 which open in response to control signals ATM and ATP, respectively, or from an input K register A89 via gate B94 which opens in response to control signal KTM. Each of the gates B90 and B94 is adapted to transfer a single data character into the memory matrix and to this end the top eight write drivers B98 receive their inputs from one of a set of OR circuits B96, each OR 96 receiving the pair of corresponding bit outputs from each of the gates B90 and B94. Naturally, in any data transfer cycle the operation of the gates B90 and B94 is mutually exclusive, depending upon the particular mode in which the system is operating. EC bit data is transferred back to memory by an AND A86 at TP5 time and by an AND A81 at TP13 time. An OR B91 channels the EC bit data to gate B92.

The K register is an eight stage input register which is used for loading all new data characters into the working data section of the memory matrix. Each of the eight inputs to the K register is fed by an OR circuit A88 with each OR circuit receiving the corresponding bit outputs from a pair of eight bit transfer gates A80 and A82. The latter gate transfers the data output signals from the keyboard in response to an output from an AND circuit A76. Gate A80 transfers a fixed eight bit code combination representative of a space character from a space register A78 in response to a control input from an OR circuit A74. The latter circuit operates to produce the gate opening control signal in response to outputs from either of a pair of AND circuits 70 or A72.

As was previously mentioned, all readout of data from memory B100 is destructive in nature. The A register thus operates as a transfer register to temporarily store a set of data, EC and program bits to enable the performance of control operations based on the significance of the data and operates further to allow recirculation of the data back to its position in memory, if that is desired. For the purposes of the present description, since the processes of loading and altering program data are irrelevant to the instant invention, the program characters stored in matrix B100 are never altered and are always recirculated back into the memory after each data readout operation.

Figure 5A:
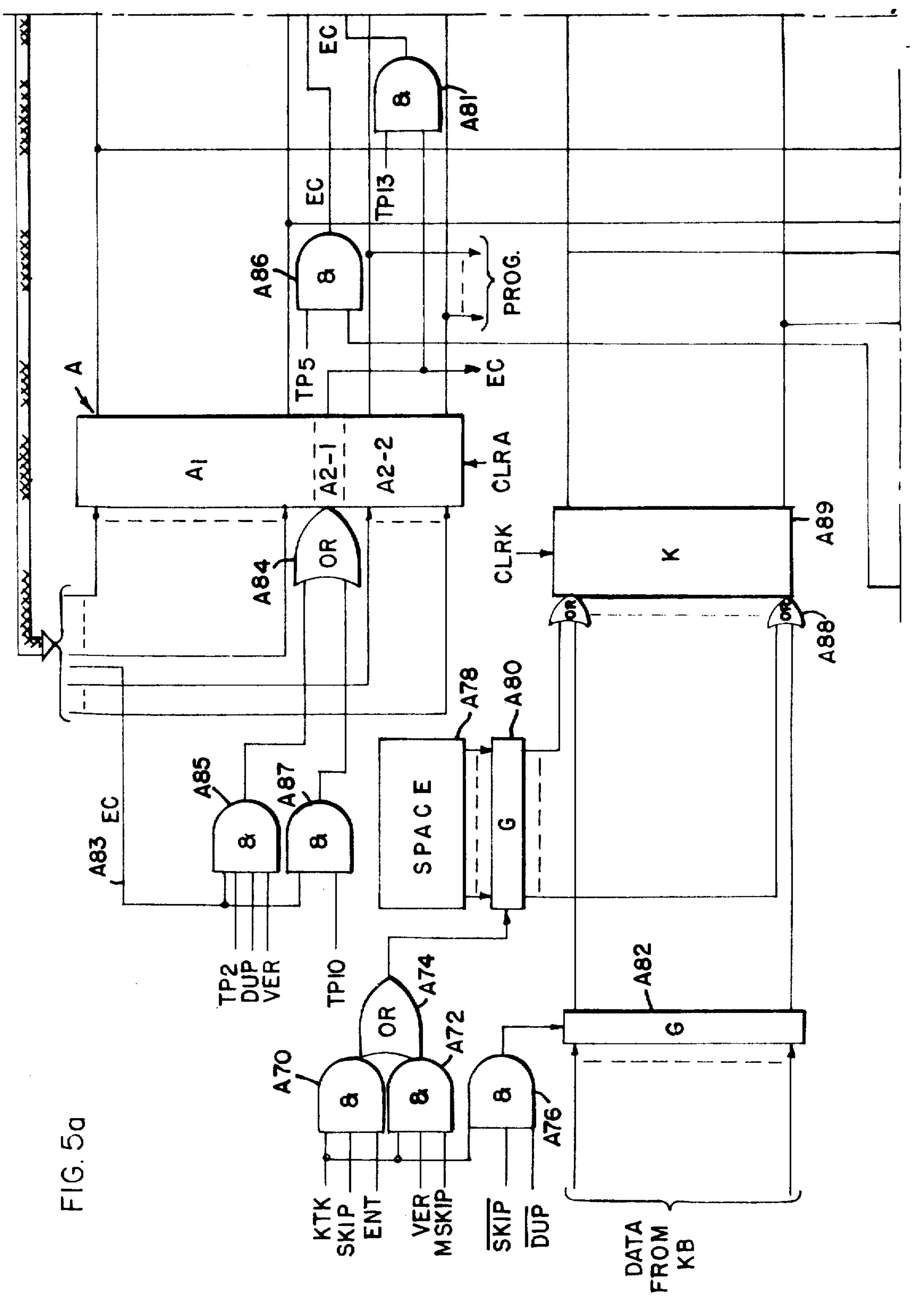
FIGS. 5*a*, 5*b*, 5*c*, 5*d* and 5*e* are schematic diagrams of the circuits within the memory and control logic unit of FIG. 1.
Figure 5B:
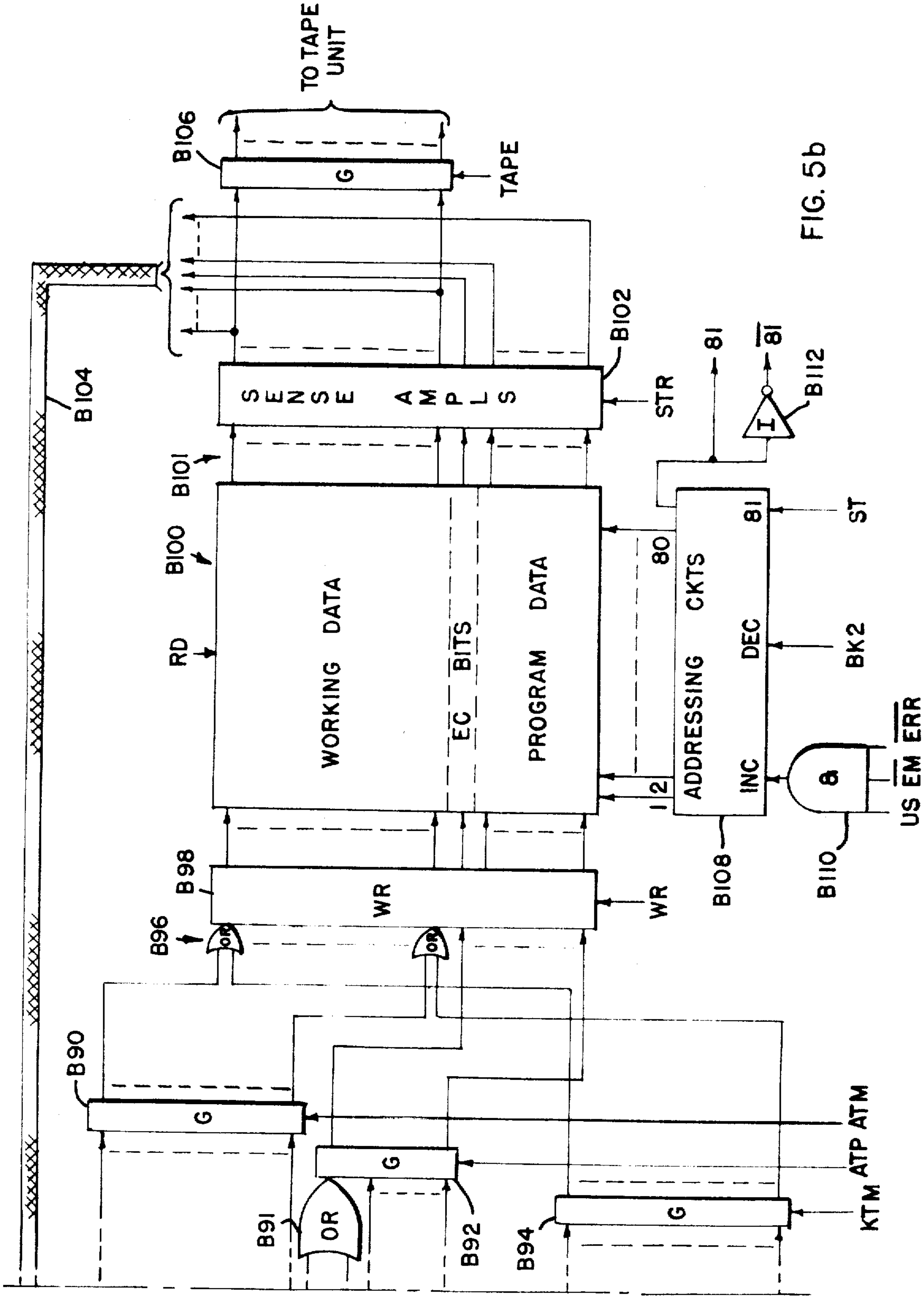
Figure 5C:
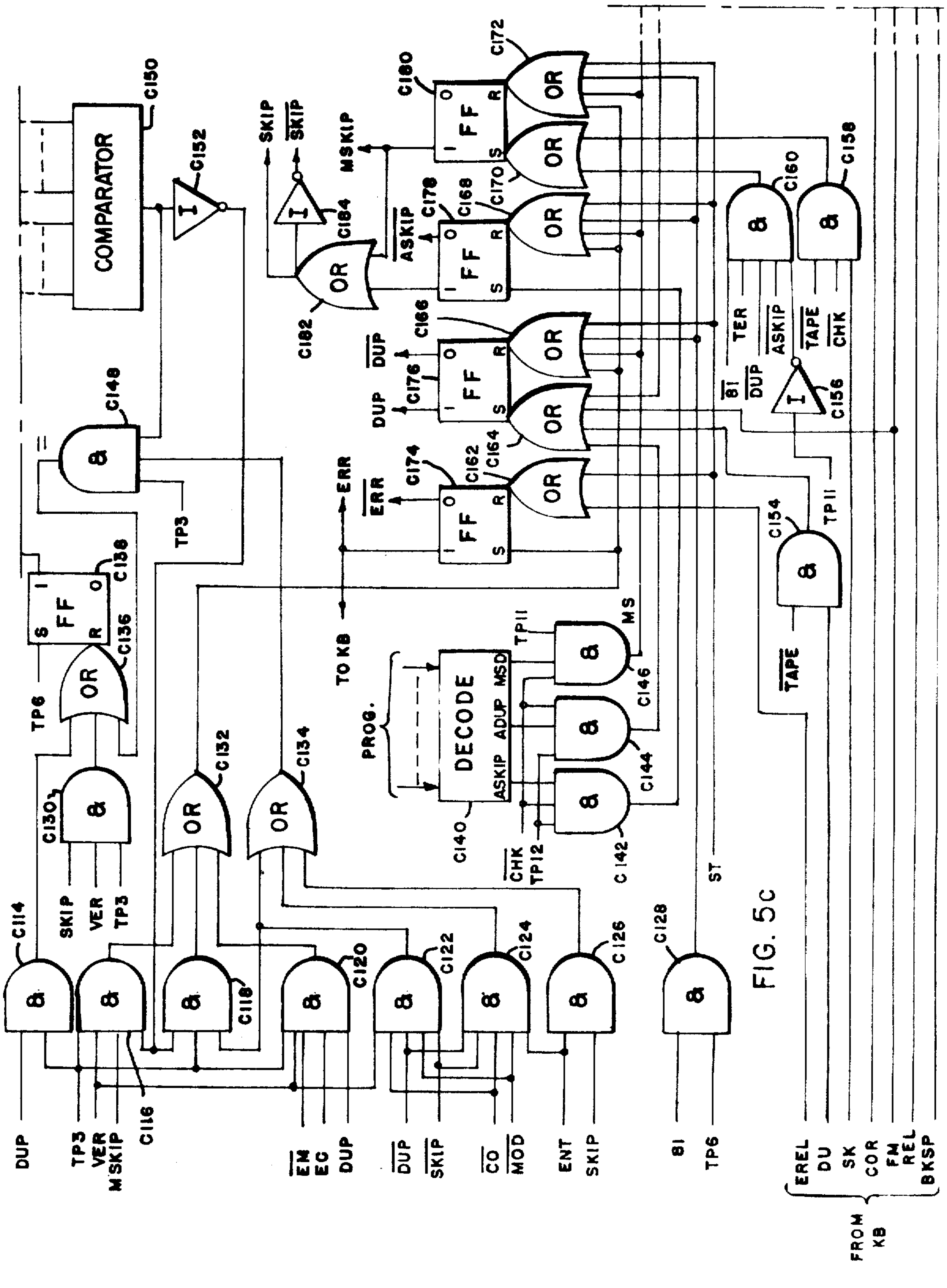
Figure 5D:
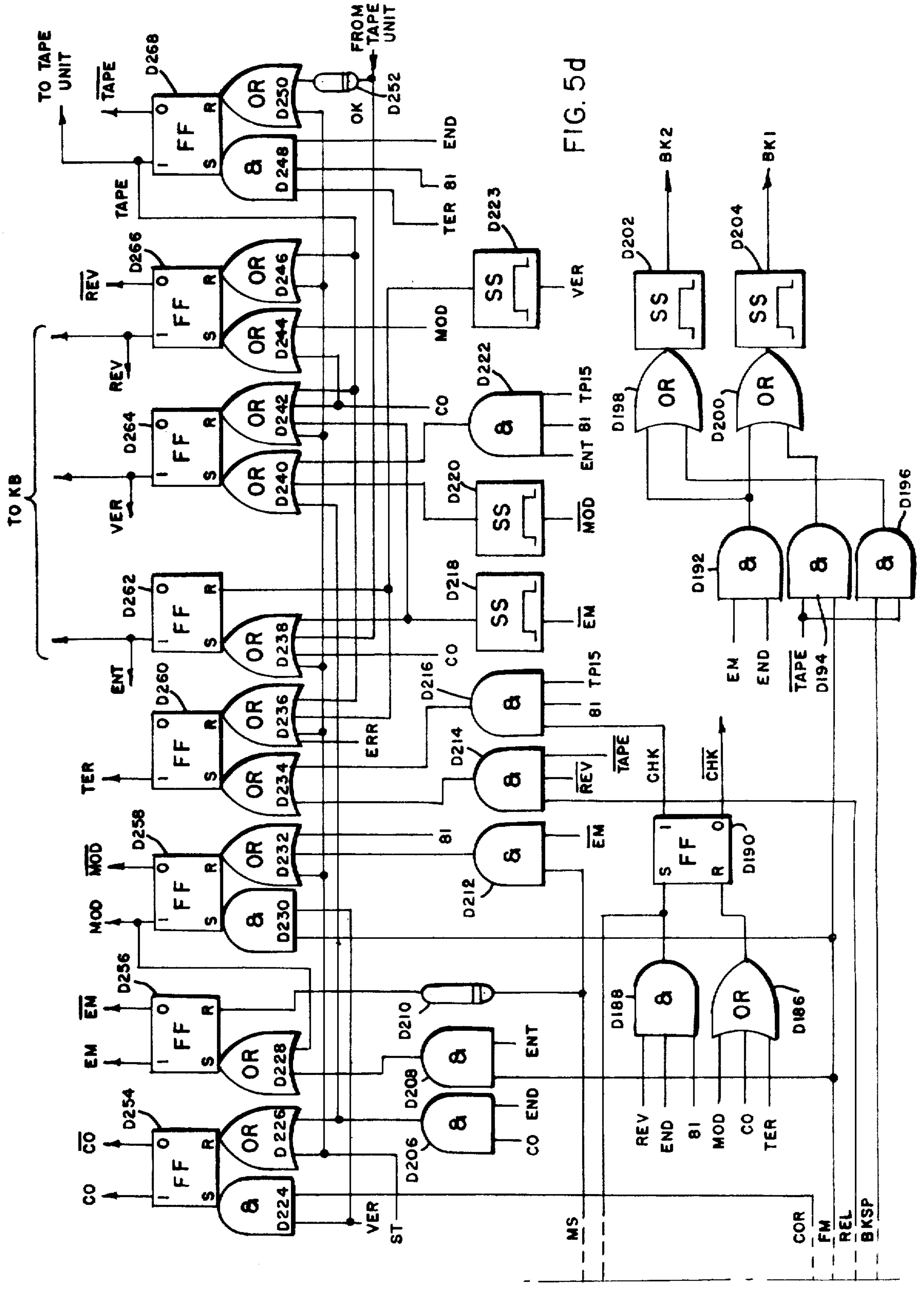
Figure 5E:
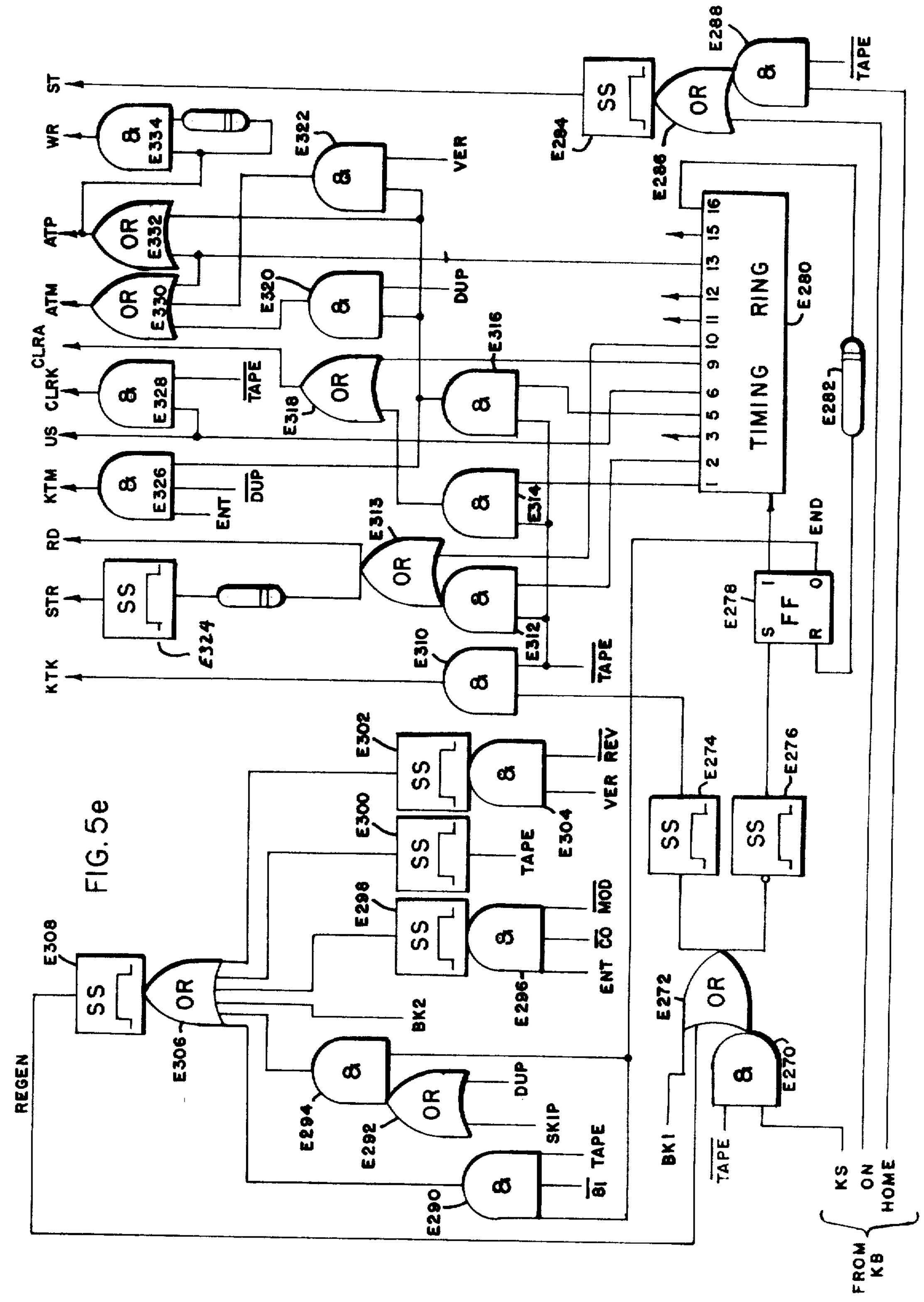

The logic circuits for controlling all entry, verify and tape cycle operations are shown in detail in FIGS. 5c, 5d and 5e. The basic timing signals for controlling the sequence of the various operations are shown in FIG. 5e and are described next with additional reference to FIG. 6, which is a waveform diagram illustrating the interrelationship of various of the timing pulses.

A timing ring E280 comprising a ring counter which is driven by a selectively operable fixed frequency clock circuit (now shown) is the basic element in the timing circuits. Ring E280 has 16 output lines which, when the ring is operated through one timing cycle, produce a sequence of 16 timing pulses TP1 through TP16 as illustrated in FIG. 6. When not being cycled ring E280 sits in a position with TP16 high and the remaining 15 output lines low. A flip-flop E278 controls the operation of the timing ring. When flip-flop E278 is set by an output from single-shot E276 the ring turns on whereupon TP1 goes high and TP16 and END (the latter of which is taken from the reset output of flip-flop E278) go low. The clock circuit drives the ring outputs through the sequence of timing pulses (FIG. 6) until TP16 goes high again. The leading edge of this signal is transferred by a delay circuit E282 to the reset input of flip-flop E278 so that following a period of time approximately equal to the width of a TP pulse, the output of delay circuit E282 resets the flip-flop, bringing END high and turning off the timing ring. This single cycling of the timing ring constitutes one character transfer cycle. When END goes high at the end of a character transfer cycle it may or may not automatically trigger another character transfer cycle, depending upon the state of the remaining control circuits as described subsequently.

A character transfer cycle is triggered from the keyboard by a KS signal which, as previously mentioned, is generated upon the actuation of any data key. KS activates an AND circuit E270 which generates an output through an OR circuit E272 to trigger a single-shot E274. The output of this single-shot, after being gated through an AND circuit E310, constitutes the KTK control signal which is used to open the K and Space register entry gates A80 and A82, as previously described. When the operator releases the key KS goes low and the resulting H to L transition at the output of OR E272 triggers single-shot E276 whereupon flip-flop E278 is set and a character transfer cycle begins. As the timing ring cycles from TP1 through TP16 a predetermined sequence of control signals is generated by logic circuits which are shown connected to the outputs of the timing ring. The makeup of any given sequence of control signals depends on the particular mode in which the system is operating. Since the various types of character transfer cycles for each different mode of operation are described in detail subsequently under the section entitled "Operation" further elaboration is not provided at this point.

Under certain circumstances a character transfer cycle is triggered automatically rather than in response to the manually initiated KS signal. Under certain conditions such automatic initiation of a transfer cycle is triggered by a single-shot E308. The output therefrom is called a REGEN pulse which is fed back to the input of OR E272 and, operating therethrough, controls the operation of single-shots E274 and E276 in the manner previously described. The REGEN single-shot E308 is triggered into operation by the output from a six-input OR circuit E306. Three of the inputs to OR E306 are provided, respectively, from an AND circuit E290, a single-shot E302 and an AND circuit E294. Each of the latter circuits responds under a predetermined set of conditions when the END signal from flip-flop E278 transfers from the low state to the high state. The operation of timing ring E280 for these situations is illustrated in the lower portion of FIG. 6 wherein, as illustrated, when END shifts high REGEN also shifts high, bringing with it KTK due to the triggering of single-shot E274 through OR E272. Thereafter, when single-shot E308 times out and REGEN shifts to the low state the character transfer cycle is initiated as single-shot E276 is triggered through OR E272. Since the various sets of logic conditions which produce this automatic regeneration of the character transfer cycle in response to END are elaborated upon in detail in the subsequent description under "Operation" no further discussion is given at this point.

There are still additional logic conditions which set up automatic initiation of a character transfer cycle. Thus, the presentation of a BK2 control signal to the input of OR E306 triggers a transfer cycle through single-shot E308 as does the generation of an output pulse at either of the single-shots E298 or E300. The conditions which determine the generation of these signals is also made apparent in the subsequent description of operation.

A comparator C150, a decode circuit C140 and a plurality of control flip-flops C138, C174, C176, C178, C180, D254, D256, D258, D260, D262, D264, D266, D268 and D190 are the principal elements which perform the remainder of the control functions. Comparator C150 receives the eight bit output from section A1 of the A register and the eight bit output from the K register and provides a high level output signal if the binary characters represented by the signals on both sets of lines are identical. In such a situation the output from the comparator partially conditions an AND circuit C148 which is activated at TP3 time of the character transfer cycle providing it is receiving a high level input from an OR circuit C134. An active output from AND C148 operates through an OR circuit C136 to reset flip-flop C138. This flip-flop determines whether or not a "set" EC bit is to be transferred back into the memory matrix B100. Since flip-flop C138 is always set at TP6 time of each character transfer cycle, an EC bit will always be entered into the memory by AND A86 during the following character transfer cycle at TP5 time unless flip-flop C138 had been reset the preceding TP3 time by either AND C114, AND C130 or AND C148. The various logic conditions governing the operation of these AND circuits is explained in detail in the subsequent description of operation.

An inverter C152 is connected to the output of comparator C150 and generates an "unequal" signal which is transmitted to the inputs of a pair of AND circuits C116 and C118. Under certain logic conditions, to be described subsequently, these AND circuits are activated by an unequal comparison to produce an output which is transmitted to an OR circuit C132 to set the error flip-flop C174, triggering the error alarm ALR at the keyboard. The error signal is also triggered by an output from an AND circuit C120 which operates under certain logic conditions upon the detection of an EC bit stored in the A register. Error flip-flop C174 is reset by an OR circuit C162 and responds to either an EREL signal produced by depression of the error release key or to an ST signal generated by a single-shot E284 which is triggered by an OR circuit E286 either when the system is initially turned on or when a HOME signal is produced by actuation of the home key.

Decode circuit C140 is connected to the output lines from section A2-2 of tne A register, which lines indicate the program data stored in that section. Whenever the program data includes an MSD bit the MSD output from circuit C140 goes high and partially conditions an AND circuit C146. When the program data includes a bit indicative of an automatic dup operation the ADUP output from circuit C140 partially conditions an AND circuit C144. When the program data includes a bit indicative of an automatic skip operation the ASKIP output from circuit C140 partially conditions an AND circuit C142. AND C142 and C144 are sampled at TP12 time of the transfer cycle when the system is not running through a check cycle (to be described subsequently). An output signal from AND 142 sets automatic skip control flip-flop C178 which in turn drives an OR circuit C182 to bring control signal SKIP high and to cause an inverter C184 to drop control signal $\overline{SKIP}$ low. An output from AND C144 sets dup control flip-flop C176 through an OR circuit C164. This brings the DUP control signal high and drops the $\overline{DUP}$ signal low.

The manual skip control flip-flop C180 is set by an OR circuit C170 in response to generation from the keyboard of an SK signal, which activates an AND circuit C158 at any time except during a check cycle and a tape cycle. Setting of flip-flop C180 also switches OR C182 and inverter C184 to raise SKIP and to drop $\overline{SKIP}$. Flip-flop C180 is also adapted to be set by a signal from AND C160 under certain conditions (to be described subsequently) in response to actuation of the release key.

The MS output from AND C146, which is sampled at TP11 time, operates to reset the DUP flip-flop C176 through OR C166, to reset the automatic skip flip-flop C178 through OR C168 and to reset the manual flip-flop C180 through OR C172. The MS signal is also used to reset control flip-flops D256 and D258 under conditions to be later described. The DUP flip-flop C176 is also settable by an output from AND circuit C154 which operates in response to the keyboard generated DU signal. Flip-flop C176 is also settable in response to FM or to the output from an AND circuit D188 which is activated at the end of any verify cycle during which new data was entered into the memory.

AND D188 also sets a check cycle control flip-flop D190. This flip-flop operates to automatically drive the system through a DUP cycle at the end of each verify cycle during which new data was entered so that the memory can be inspected for the presence of any EC bits prior to release of the data block to the tape drive.

Control flip-flop D254 is settable by an output from an AND D224 and is resettable by an output from an OR D226. Flip-flop D254 operates, in a manner to be described in detail subsequently, to control the entry of a single new character into the memory during a correction operation in verify mode.

Flip-flops D256 and D258 operate to control the field modify operations. During entry mode a keyboard generated FM signal activates an AND circuit D208 which sets flip-flop D256 through OR D228. The setting of flip-flop D256 brings up control signal EM and drops $\overline{EM}$. The flip-flop is reset by an MS signal from AND C146 after a 1-TP pulse delay introduced by a delay circuit D210. Flip-flop D258 is set by an output from an AND circuit D230 in response to a keyboard generated FM signal presented during verify mode. The setting of flip-flop D258 sets flip-flop D256 and shifts the MOD control signal positive while $\overline{MOD}$ goes negative. Flip-flop D258 is reset by an OR circuit D232 either when the verify cycle is ended and the 81 control signal from circuits B108 comes up or when an AND circuit D212 generates an output in response to MS after $\overline{EM}$ has come up. As will become apparent in the subsequent description of operation, the latter condition occurs on the second MS signal after the setting of flip-flop D258. The flip-flop is also reset by ST at the beginning of system operation or in response to a HOME signal.

Flip-flop D260 generates at its set output a terminate signal TER which is used in initiating a tape cycle upon completion of a successful verify operation. Under normal circumstances the operator actuates the release key to generate REL at the end of the verify cycle and this activates AND D214 to set flip-flop D260 through OR D234. However, in a situation requiring reverification of data upon completion of the verification cycle flip-flop D260 is not settable by REL and must be set instead by an AND circuit D216 which generates an output only after the full contents of the data block have been inspected during a check cycle and no EC bits have been encountered. Flip-flop D260 is resettable by an OR D236 when ERR comes up in response to detection of an error or when a single-shot D223 generates an output pulse anytime VER goes positive. OR D236 also resets flip-flop D260 when a tape cycle is initiated, raising TAPE, or by the generation of ST.

Flip-flops D262, D264, and D266 are the entry, verify and reverify control elements, respectively. Set outputs from these flip-flops are transmitted back to the keyboard to enable execution of the various keyboard inhibit and indicating functions previously described. The set outputs from these flip-flops are also used for various control purposes within the memory and control logic unit itself. The entry and verify flip-flops D262 and D264 usually operate in a mutually complementary fashion so that anytime the entry flip-flop is set the verify flip-flop is reset and anytime the verify flip-flop is set the entry flip-flop is reset. Thus, whenever flip-flop D262 is set by ST acting through OR D238 flip-flop D264 is reset by ST acting through OR D242. When flip-flop D262 is set by CO, flip-flop D264 is reset by the same signal. When the entry flip-flop is set by an output from single-shot D218 when $\overline{EM}$ goes positive, the same signal is used to reset the verify flip-flop. Anytime the verify flip-flop is set, bringing VER positive, single-shot D223 resets the entry flip-flop.

The only time the operation of the entry and verify flip-flops is not mutually exclusive is when the system is operating in a tape cycle (TAPE is positive). This signal is used to reset flip-flop D264 at the completion of any verification or reverification cycle and since flip-flop D262 must have already been reset, both flip-flops are then in the reset state and remain so for the duration of the tape cycle. When the tape cycle terminates OK is transmitted from the tape unit and sets flip-flop D262 whereupon the mutually exclusive mode of operation of the two flip-flops resumes.

Reverify flip-flop D266 is settable through an OR circuit D244 by either CO or MOD, both of which control signals are generated during a correction cycle wherein new data is entered into the memory during verify mode. The flip-flop is resettable by an OR D246 in response to either ST or to TAPE.

Control flip-flop D268 governs the operation of the system throughout the tape cycle and its set output line is connected to the tape unit. Whenever TAPE goes positive in response to the setting of flip-flop D268 by an output from AND D248, the tape unit is ready to receive the 80 data characters of a data block which are transmitted to the tape unit through gate B106. When the tape unit has performed its function of recording the data block on magnetic tape 30 (FIG. 1) it generates OK which is transmitted back to the control unit and which functions to reset flip-flop D268 through a delay circuit D252 and an OR circuit D250. OK also sets the entry flip-flop D262.

A pair of single-shots D202 and D204, together with the group of logic circuits which operate to actuate them, control the generation of the memory backspacing pulses BK1 and BK2. BK2 is fed directly to the decrementing input of the addressing circuits B108 and operates to step those circuits backward one position. BK1 is fed to the timing circuits where it operates through OR E272 to trigger a new character transfer cycle.

Each keyboard generation of BKSP activates AND D196 to produce BK2 to backspace one position in memory. Depression of the backspace key does not trigger a character transfer cycle. Depression of the field modify key generates FM which does trigger single-shot D204 to initiate a character transfer cycle. If EM is still up at the end of this cycle AND D192 triggers both single-shots D202 and D204 initiating both a memory backspace and a character transfer cycle.

Tape Unit

The tape unit may be any conventional type of digital magnetic tape recorder adapted to record on nine-channel tape (eight channels of data bits and one channel of parity bits). Such a tape unit may, for example, have its own buffer memory and timing system whereby the TAPE signal from the memory and control logic unit conditions the system for operation and the presentation of each data character from gate B106 initiates a timing cycle for loading of the character into the tape buffer. After the 80 characters of the data block have been received the tape unit then initiates a tape feed operation and when the tape reaches the desired recording speed the timing system reads out the data block from the tape buffer for recordation on the tape. At that point the tape may be stopped and the tape cycle terminated with the transmission of OK back to the control unit.

It may, however, in accordance with conventional checking techniques, be desired to backspace the tape after the recording cycle and drive it forward for a read-after-write check procedure wherein the data recorded on the tape is compared with the data stored in the tape buffer. If such a check is desired the transmission of OK is preferably delayed until after the check has been successfully completed.

If the read-after-write check is not desired, the tape buffer may be eliminated by simply initiating forward tape movement in response to the TAPE signal from the control unit and driving the tape write-head directly with the data signals transmitted from gate B106.

Nonetheless, since the particular technique used for recording the data on the tape is unimportant to the operation of the present invention and since the provision of a suitable tape recorder is well within the skill of one familiar with data processing techniques, further elaboration on the tape unit is omitted.

Operation—Basic Data Transfer Cycles

Before describing the detailed sequence of operation of the circuits of FIGS. 4 and 5 for each of the different operational modes of the system, a brief description of the various types of different character transfer cycles will be given with reference to FIGS. 2 and 3.

Figure 2:
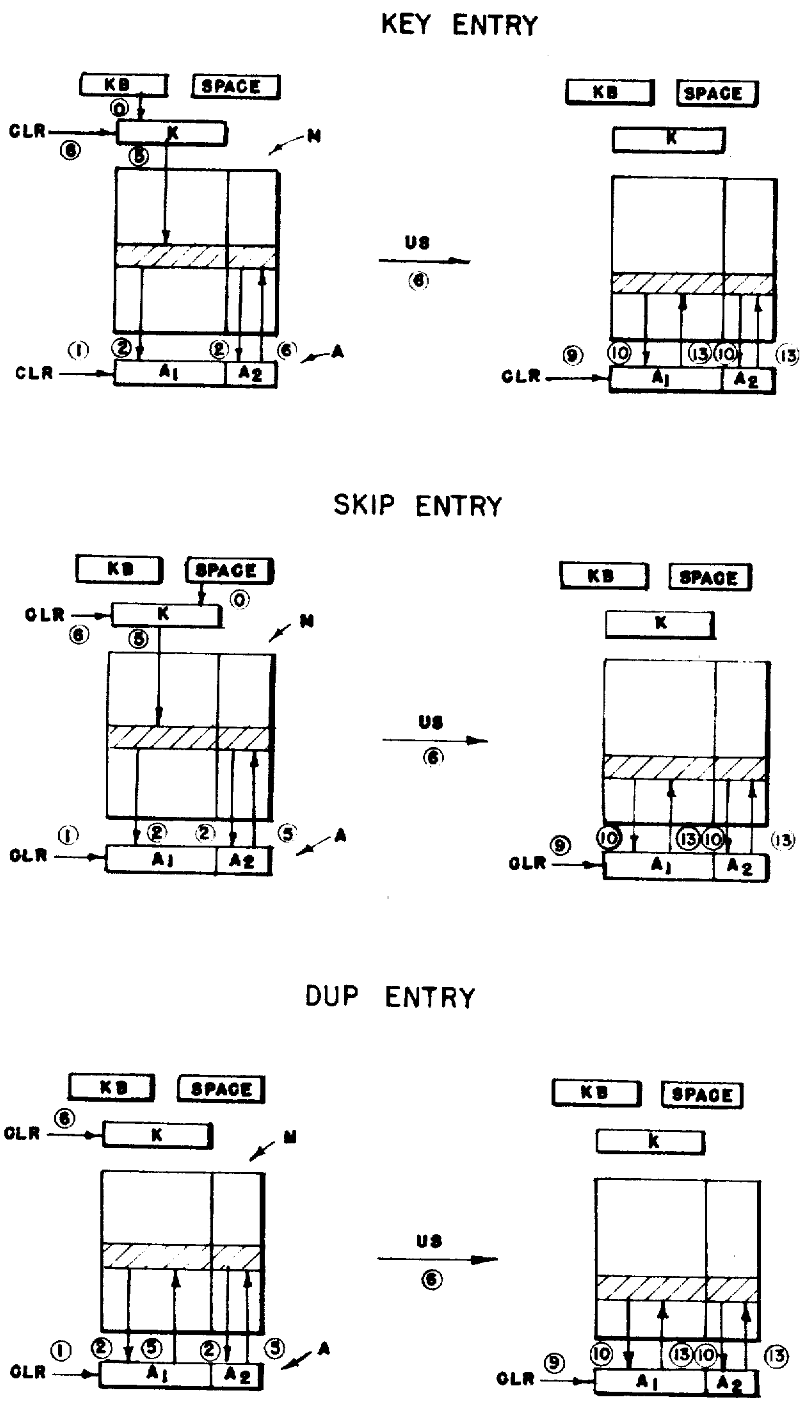
FIG. 2 is a schematic diagram showing the basic data transfer sequences executed by the system during each of its three types of entry operations, key entry, skip entry and dup entry.

FIG. 2 shows the three different types of character transfer cycles employed by the system when operating in the entry mode. The portion of FIG. 2 entitled "Key Entry" schematically describes the character transfer cycle which is initiated by actuation of a data key. In the diagram the block M represents the memory matrix B100. The left-hand portion of M represents the working data section of the memory and the right-hand portion represents the EC bit and the program data storage section of the memory. Each arrow represents a data transfer operation which takes place at the TP time denoted by the circled number next to the arrow. The crosshatched section of M represents the particular character storage location being addressed.

When the operator depresses a data key to start a key entry transfer cycle a coded character is transferred from the keyboard to the K register at 0 time (the designation 0 being used since the transfer occurs prior to the generation of the first TP pulse). Thereafter, at TP1 the A register is cleared and at TP2 all data from the addressed location of the memory is transferred into the A register. At TP5 the EC bit and program data is transferred from Section A2 of the A register back into memory while at the same time the character stored in the K register is transferred to the data section of the memory. At TP6 the K register is cleared and US is generated to step the addressing circuits to the next location in the memory.

Thereafter, at TP9 the A register is again cleared, at TP10 the data from the newly addressed storage location is transferred to the A register and at TP13 the same data is transferred from the A register back to memory. The character transfer cycle then terminates without further data transfer.

The character entry cycle which is employed during a skip operation in entry mode is shown in FIG. 2 under the title "-Skip Entry." As there shown, the character transfer cycle is in all respects identical to the key entry cycle except that at zero time no character is transferred from the keyboard to the K register but instead a space character is transferred from the space register to the K register.

The character transfer cycle which is employed during a dup operation in entry mode is shown under the title "DUP Entry." Each character transfer cycle in a DUP operation calls simply for the clearing of the A register at TP1, the transfer of all data from the addressed location of the memory to the A register at TB2, transfer of the full data back to the memory at TP5, addressing of the next location at TP6, clearing of the A register at TP9, a second transfer from the memory to the A register at TP10 and a transfer back to memory at TP13.

Figure 3:
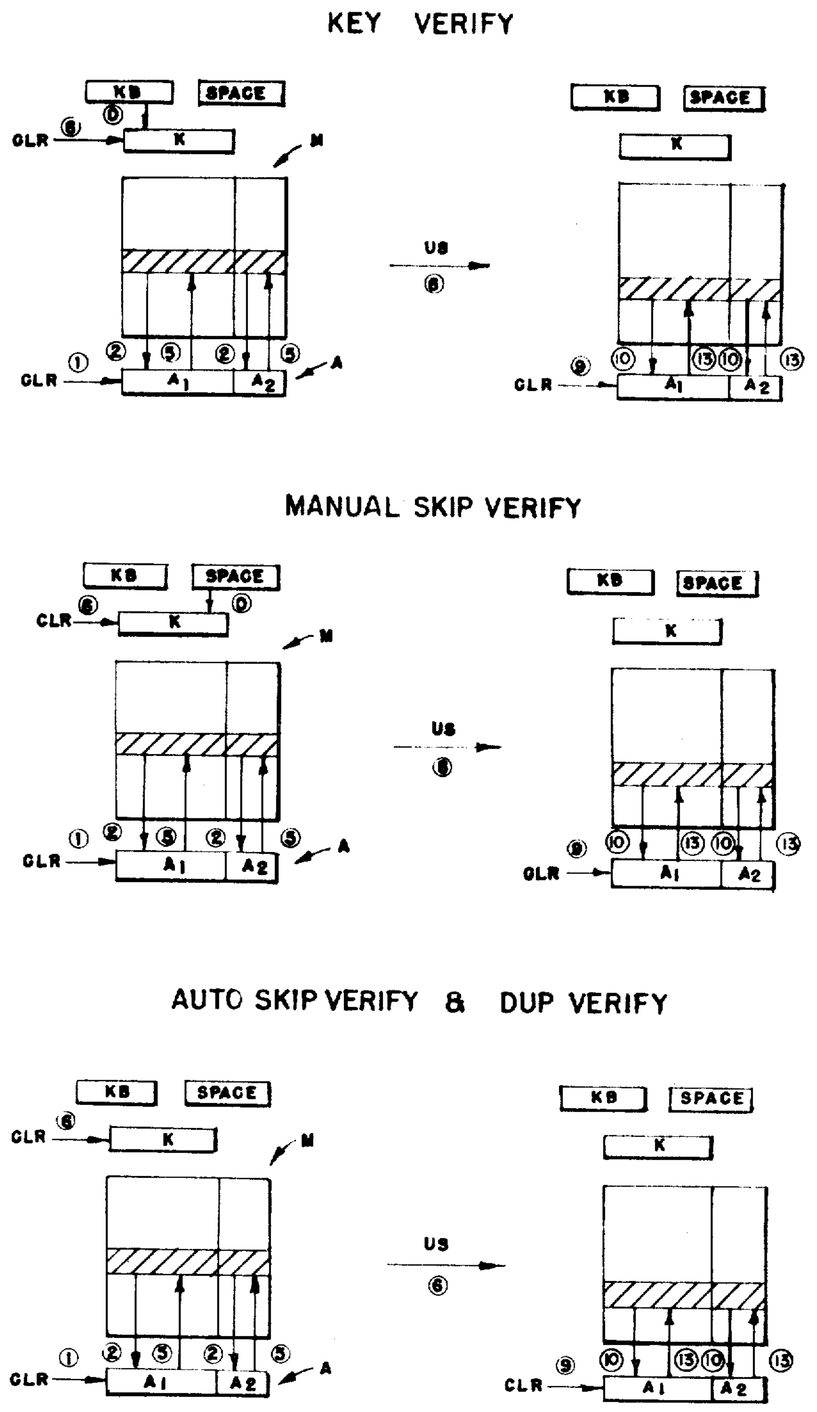
FIG. 3 is a schematic diagram showing the data transfer sequences executed by the system during each of its three types of verify operations, key verify, manual skip verify and auto skip and dup verify.

FIG. 3 shows the three types of character transfer cycles employed during the verify mode. As shown at the top the key verify transfer cycle, which is initiated by depression of a data key, calls for the entry of a data character into the K register at zero time. The remaining portion of the cycle is executed in a manner identical to that for the dup entry operation. The character transfer cycle employed during a manually initiated skip operation in the verify mode, shown in the middle section of FIG. 3, is identical to the basic verify cycle except that at zero time the K register receives a space character rather than a keyboard generated data character.

The cycle employed in an automatically initiated skip operation or a dup operation during verify mode is, as shown at the bottom of FIG. 3, identical to the cycle employed for the dup entry operation.

Operation—Entry Mode

As mentioned, there are three different operational procedures which are key selectable or programmable when the system is operating in the entry mode. These are the basic key-initiated entry, skip entry, which may be initiated either from the keyboard or automatically from the stored program, and dup entry which also may be initiated manually or automatically. To put the system in the entry mode in the first place it is assumed that the operator has closed switch 58 to initiate the ON pulse which in turn triggers ST which forces the addressing circuits to the 81 position and resets all control flip-flops except for the entry flip-flop which is set. In all following descriptions of operation reference is made to FIGS. 4 and 5.

As soon as the operator has turned the system on flip-flop D262 generates ENT and this in turn energizes AND E296 to trigger a REGEN pulse from single-shot E308. This triggers a character transfer cycle. During TP1 through TP5 of this first cycle no change occurs in the status of the control circuits since addressing circuits B108 are still "addressing" position 81, which is a nonexistent storage location. At TP6 US enables AND B110 to step the addressing circuits to storage location 1. At TP9 CLRA comes up to clear the A register and at TP10 RD and STR read the working data, EC bit data and program data from storage location 1 of the memory matrix and transfer it to the A register. At TP12 AND circuits C142 and C144 are sampled for an automatic skip or automatic dup output from decoder C140, which is interpreting the outputs from section A2–2 of the A register. If storage location 1 contains either of these program bits, either the dup flip-flop C176 or the automatic skip flip-flop C178 is set, enabling an automatic dup or automatic skip sequence to be triggered at the end of the transfer cycle when END comes up. Since these latter operations are discussed in detail subsequently, it is here assumed that no such program bits are present so that the flip-flops C176 and C178 remain reset. Thus, at the end of the transfer cycle END comes up but does not trigger any new transfer cycle and the control circuits cease operation, awaiting the first key-in operation. It is noted at this point that the addressing circuits are accessing storage location number 1.

When the operator actuates a data key a coded character signal is generated at the output of encoder 42 and is presented to the inputs of gate A82. An instant later KS appears at the input of AND E270, causing OR E272 to trigger a character transfer cycle. Single-shot E274 immediately activates AND E310 to generate KTK which, since $\overline{SKIP}$ and $\overline{DUP}$ are high, activates AND A76 to open gate A82 to load the character signal into the K register.

When the operator releases the key, dropping KS, single-shot E276 sets flip-flop E278, turning on the timing ring E280 to initiate a sequence of TP pulses. At TP1 AND E314 and OR E318 generate CLRA to clear the A register. At TP2 AND E312 feeds a pulse through OR E313 to initiate the RD and STR signals, reading the data out of storage location 1 of the memory matrix whereupon it is loaded into the A register.

Since the system is operating in the entry mode and $\overline{DUP}$, $\overline{SKIP}$, $\overline{CO}$ and $\overline{MOD}$ are all high, AND C124 feeds a signal through OR C134 to partially condition AND C148. Thus, at TP3 AND C148 is sampled and if the contents of the A1 section of the A register match that of the K register AND C148 generates an "equal" signal. This causes flip-flop C138 to be reset which deconditions AND A86. If the contents of the A1 and K registers had not been equal AND C148 would not have been activated and thus flip-flop C138 would have remained in the set state and AND A86 would have remained in a conditioned state.

At TP5, AND E316 produces an output which activates AND E326 to generate KTM and OR E332 to generate ATP. These two signals open gates B94 and B92, respectively. ATP activates AND E334 after a slight delay to bring up WR. Thus, the contents of the K register are loaded into the working data section of storage location 1 in the memory through gate B94 and EC bit data and program data from section A2 of the A register are loaded into the EC bit section and the program data section, respectively, of storage position 1 of the memory through gate B92. As mentioned above, a set EC bit will be present at the output of OR B91 for loading into the memory only if the contents of the A1 and K registers had been unequal during the previous TP3 time.

At TP6 time US and CLRK come up to advance the addressing circuits B108 to storage location 2 and to clear the K register, respectively.

At TP9 OR E318 generates CLRA to once again clear the A register and at TP10 OR E313 again generates STR and RD whereupon the full contents of storage location 2 of the memory are transferred to the A register. At TP11 AND C146 inspects the program data in the A register for an MSD bit and at TP12 ANDs C142 and C144 inspect the program data for automatic skip or automatic dup bits.

AT TP13 OR E332 generates ATP and E330 generates ATM whereupon gates B92 and B90 are opened. An instant later WR comes up to write the contents of the A register back into storage location 2 of the memory.

At the termination of TP16 flip-flop E278 is reset, END comes up and the timing ring is turned off. Thus, assuming no automatic skip or automatic dup program bits have been encountered, no new character transfer cycle is triggered and the system waits for the operator to make the next key entry.

Following the above-outlined operational procedures, the system thus responds each time the operator actuates a data key by loading a data character into the next succeeding storage location in the memory. Along with each data character a set EC bit is loaded into the EC bit section of the memory if the newly entered character is different than the character it is replacing. If the characters are the same a reset EC bit is loaded for that storage location.

When the operator actuates the 80th data key, entering the final character of the data block into storage location 80, the 81 output line of addressing circuits B108, comes up at TP6 of the character transfer cycle. Thereafter, at TP15 of the cycle AND D222 feeds a pulse through OR D240, setting the verify flip-flop D264. This in turn triggers single-shot D223 to produce an output which resets the entry flip-flop D262. At the termination of the cycle, then, the system is in verify mode.

To manually initiate a skip operation the operator actuates the skip key, generating SK and causing AND C158 to set the manual skip flip-flop C180 through OR C170. Since END is already up, the setting of flip-flop C180 activates AND E294 to trigger a character transfer cycle. This cycle is executed in the same manner as described above for a key entry operation except that when KTK comes up at the beginning of the cycle AND A76 is not activated due to the previous dropping of $\overline{SKIP}$ and instead AND A70 is activated, opening gate A80 through OR A74. This transfers a space character from the space register A78 to the K register. Thereafter, the cycle proceeds in a manner identical to a key entry cycle as described above.

When the skip cycle terminates at TP16 END shifts positive and since SKIP is positive, causing AND E294 to be conditioned through OR E292, END activates AND E294 to trigger a REGEN pulse which automatically begins a new character transfer cycle. The new cycle is executed exactly the same as the previous cycle. Cycles continue to be automatically regenerated in this fashion until at TP11 of a cycle an MSD program bit is detected by AND C146. This generates MS which resets flip-flop C180 so that at the end of the cycle when END shifts positive AND E294 is deconditioned and automatic cycle regeneration is terminated. At that point the addressing circuits B108 are accessing the character location containing the MSD program bit. It is to be noted that during each character transfer cycle of the skip operation generation of the EC bit data into the memory by AND A86 is handled in the same manner as during a key-in cycle. That is, the previous contents of each location passed during the skip operation are compared to the character in the K register (space) and if the comparison is unequal a set EC bit is generated and if it is equal a reset EC bit is generated.

At this point it is noted that actuation of the release key to produce REL during entry mode causes AND D214 to set the terminate flip-flop D260 to bring TER positive. This causes AND C160 to set the manual skip control flip-flop C180. Since the timing ring E280 is sitting static and END is high, the setting of the skip flip-flop activates AND E294, triggering a REGEN pulse and initiating a manual skip character transfer cycle. Such cycles are repeated as above-described. It is to be noted that if no MSD program bits are encountered during the manual skip operation, the operation will continue until AND C128 is activated at TP6 of the cycle that switches the addressing circuits to 81. AND C128 then acts to reset the skip control flip-flop C180 and the automatic repetition of the cycles terminates. Also, at the end of this cycle AND D222 shifts the system to the verify mode, as previously described.

Automatic program-initiated skip operations follow the same pattern as the manually initiated skip operation just-described except that the automatic operation is initiated by an output from AND C142 at TP12 time when an automatic skip program bit ASKIP has been read out of the memory. The automatic skip operation continues until the next MSD program bit is encountered and if none is encountered it continues until the data block has been filled and the addressing circuits switch to position 81. The skip operation is then terminated just as described above for the manual operation.

A dup operation during entry mode is manually initiated by depression of the dup key, generating DU which operates AND C154 to set the dup control flip-flop C176 which brings DUP high and initiates a character transfer cycle through OR E292 and AND E294. The character transfer cycles that are executed during a dup operation differ from those of the skip and key-entry cycles (FIG. 2) in that when KTK shifts positive at the beginning of the cycle none of the ANDs A70, A72 or A76 are activated due to the existence of SKIP, VER AND $\overline{DUP}$, respectively, at the low level. Thus, KTK does not open either of the gates A80 or A82 and nothing is transferred to the K register. Also, ATP and ATM are both generated both during TP5 and during TP13 of each dup cycle causing recirculation of a full storage location of data in the A register back to the memory each cycle. Also, since AND C114 is activated each TP3 time of a dup cycle, flip-flop C138 is always reset at TP5 time thus causing the EC bit for each storage location passed during the dup operation to be reset.

The net result of each character transfer cycle of a dup operation during entry mode is thus (as seen in FIG. 2) a double transfer of data in and out of the A register and advancing of the addressing circuits B108 by one storage position. No change is made to the working data memory contents. The dup operation is terminated in the same manner as a skip operation when AND C146 detects an MSD program bit and resets the dup flip-flop C176. Also like the skip operation, if no MSD program bit is encountered the dup operation remains in effect until the addressing circuits switch to the 81 position whereupon AND C128 terminates operation and the system thereafter switches into the verify mode. Automatic dup operations are initiated by AND C144 upon the detection of an automatic dup program bit in section A2–2 of the A register. Automatic dup operations are terminated in the same manner as manual dup operations.

Actuation of the error release key during entry mode has no effect on the system since EREL operates only to reset the error flip-flop C174 which is already reset at the beginning and cannot be set during the entry mode. Actuation of the HOME key causes generation of ST which simply restores the system to the status which it had previously assumed at the beginning of the entry mode. Operation of the backspace key generates BKSP which triggers single-shot D202 to produce BK2, decrementing the addressing circuits B108 one position. No character transfer cycle is triggered. Operation of the correct key during entry has no effect since COR cannot activate AND D224 due to the low level condition of VER.

Operation of the field modify key generates FM which activates AND D208 and sets control flip-flop D256. Also, FM sets the dup flip-flop C176 and activates AND D194 to trigger single-shot D204, generating BK1. Since the system is in the dup status due to the setting of flip-flop C176, BK1 operates through OR E272 to trigger a dup character transfer cycle which is identical to that previously described except that with $\overline{EM}$ now in a low state AND B110 is deactivated so that US cannot advance the addressing circuits B108. The transfer cycle therefore operates to transfer the data of the accessed storage location from memory to the A register and back twice. On the second transfer the program data is inspected by AND C146 for an MSD bit at TP11 and if one is detected MS resets flip-flop C176 and flip-flop D256. At the end of the cycle no further operation is triggered and the system remains static with the circuits B108 addressing the first storage location of the data field (as identified by the MSD program bit). If no MSD bit is encountered, EM stays high and at the end of the transfer cycle AND D192 activates both single-shots D202 and D204 to trigger BK2 and BK1, respectively. The former signal decrements the addressing circuits one more position and the latter triggers another character transfer cycle whereupon the next lower numbered storage position is inspected for an MSD bit. This process continues until the addressing circuits are backspaced to the beginning of the data field.

Operation—Verify Mode

As described above, at the end of the entry mode, the addressing circuits switch to position 81 and the verify flip-flop D264 is set, causing single-shot D223 to reset the entry flip-flop D262. When VER shifts positive, single-shot E302 triggers a REGEN pulse which initiates a character transfer cycle for the purpose of inspecting the program bits of storage location 1. Assuming that no automatic skip or automatic dup bits are located, the transfer cycle ends and the addressing circuits remain set at storage location 1 in preparation for the first verification key stroke.

When the key stroke occurs, KS activates single-shot E274 to bring up KTK, activating AND A76 and opening gate A82 to transfer the coded data character into the K register. When the operator releases the key single-shot E276 turns on the timing ring to initiate the first character transfer cycle. At TP1 CLRA comes up to clear the A register. At TP2 RD and STR are generated to read the contents of storage location 1 into the A register. At TP3 AND C122 conditions AND C148 through OR C134 so that if the contents of section A1 of the A register match the contents of the K register AND C148 resets flip-flop C138 so that AND A86 transfers a reset EC bit to memory the following TP5 time. If the contents of the A1 and K registers do not match, AND C148 does not reset flip-flop C138 and a set EC bit is transferred into memory the following TP5 time. Also, the comparator output inverter C152 activates AND C118 and an error signal is produced through OR C132 to set the error flip-flop C174, bringing up ERR and dropping $\overline{ERR}$. The latter signal thus deconditions AND B110 so that at TP6 US does not advance the addressing circuits. Also, the output from OR C132 resets any of the control flip-flops C176, C178 or C180 that are in the set state so that any skip or dup operation in process is halted. To resume normal verification the operator must follow error correction procedures to be described subsequently. For the present, however, it is assumed that a character match is obtained and no error condition is generated so that at TP6 US activates AND B110 to step the addressing circuits to the next storage location. Assuming that no automatic skip or dup program bits are discovered at TP12 time, the character transfer cycle terminates after TP16 and the system remains in a static condition awaiting the next verification key stroke.

Assuming the whole data block is to be key verified, the operator then goes on to actuate 79 more data keys, repeating the above-described cycle of operation each time. After the operator has successfully verified the 80th character to complete the block, she actuates the release key to bring up REL.

REL activates AND D214 to set flip-flop D260, bringing up TER. Since the addressing circuits B108 are set to position 81 and END is high, TER activates AND D248 to set flip-flop D268, bringing up TAPE. The latter signal resets the verify flip-flop D264 and the terminate flip-flop D260 and initiates a tape cycle.

When the operator actuates the skip key during verify mode, SK energizes AND C158 which in turn sets flip-flop C180, bringing up MSKIP. This raises SKIP and drops $\overline{SKIP}$. Thus, single-shot E308 is triggered through OR E292 to produce a REGEN pulse which triggers a character transfer cycle. This cycle has been generally described in connection with the center section of FIG. 3. KTK shifts positive and thus activates AND A72 and OR A74 to open gate A80 to transfer a space character into the K register. Thereafter, the A register is cleared by CLRA and the data from the then-accessed storage location in the memory is transferred into the A register by RD and STR. Next, at TP3 AND C130 resets flip-flop C138 to reset the EC bit and AND C116 produces an error signal through OR C132 if comparator C150 indicates that the character stored in section A1 of the A register is not a space character. If a proper match is obtained, no error signal results and at TP5 the contents of the A register, including the reset EC bit, are written back into memory by the application of the ATP, ATM and WR signals.

At TP6, the addressing circuits are advanced to the next position in memory and at TP10 the contents of that storage location are transferred to the A register so that the program data can be checked by AND C146 for an MSD bit. If such a bit is present, MS is generated to reset flip-flop C180, terminating the skip operation in the usual manner.

When the operator actuates the dup key during verify mode, DU activates AND C154 which in turn sets the dup flip-flop C176. Since END is high, the positive shift of DUP activates OR E292 and triggers single-shot E308 to generate a REGEN pulse, initiating a character transfer cycle. This cycle is generally described in connection with the bottom section of FIG. 3. No data is gated into the K register and comparator C150 is not used. Each dup-verify cycle includes simply a reading of the data of the accessed storage location into the A register and back to memory twice. The EC bit data from the memory is read into the A register undisturbed at TP2 through AND A85. At TP3 AND C120 is activated if there is a set EC bit and causes OR C132 to generate an error signal. If there are no set EC bits encountered during the dup operation then the character transfer cycles are repeated as the addressing circuits step through the memory until AND C146 is energized by a MSD bit to arrest the operation.

At TP3 time of each character transfer cycle during the dup operation AND C114 resets flip-flop C138 so that the EC bit is always transferred back to the memory in the same state that it was transferred into the A register. That is to say, if there is no set EC bit AND C114 is activated at TP3 to reset flip-flop C138 so that a reset EC bit is transferred back to memory. If there is a set EC bit transferred into the A register AND C114 will not be activated since the error signal generated by AND C120 through OR C132 drops DUP low, deconditioning AND C114 so that flip-flop C138 stays set and the set EC bit is transferred back to memory at TP5. Since in the latter situation the memory addressing circuits are blocked from advance at TP6 due to the negative shift of ERR, the same group of data is reread from memory at TP10 time with the set EC bit being transferred to the A register in this instance through AND A87. The following TP13 time when the data is transferred from the A register back to memory the set EC bit is passed through AND A81.

The sequence of operations just-described also occurs when the dup operation is automatically initiated during the verify mode. Like the manual dup operation, the automatic operation continues until an MSD bit is located or until a set EC bit is encountered, at which time the dup flip-flop C176 is reset and the operation is halted.

In an automatically initiated skip operation during verify mode, the character transfer cycle is the same as just-described for the dup-verify operation. The only difference is that AND C130 unconditionally forces a reset EC bit to be transferred back to memory each TP5 time and AND C120 is inactive whereupon the EC bit content of the A register is ignored. Thus, in an automatic skip operation during verify the addressing circuits B108 simply step their way through the memory until an MSD program bit or the end of the data block is encountered.

When the addressing circuits advance to position 81 during verify, and if verification has been successful, meaning that the operator has not had to enter any new data into the memory, $\overline{REV}$ and $\overline{TAPE}$ will both be high. The operator thus actuates the release key to bring up REL whereupon AND D214 is activated, setting flip-flop D260. This shifts TER positive whereupon AND D248 is activated to set flip-flop D268 and initiate a tape cycle.

Actuation of the home key during verification generates HOME, which triggers single-shot E284 to produce ST. This has the effect of resetting the system back to entry mode at the start position. The home key is thus used only when the operator decides that she should go all the way back and start the record over from the very beginning. Since this is a rather extraordinary measure, as are the backspace, correct and field modify operations, interlocking of these keys with the error release key assures that the operator does not inadvertently or hastily actuate one of these functions. Actuation of the backspace key during verify simply steps the addressing circuits B108 back one position, just as during entry. No character transfer cycle is initiated.

Operation—Error Correction and Reverification

Whenever the error-indicating output from OR C132 occurs, error flip-flop C174 is set, bringing up ERR, and the automatic function flip-flops C176, C178 and C180 are reset.

Since the positive shifting of ERR deconditions AND B110, the data transfer cycle during which the error was detected terminates without further advance of the addressing circuits. The operator must then actuate the error release key before anything else can be done since AND 46 (FIG. 4) is holding gate 40 closed so that any operation of the data keys or the skip or dup keys is ineffective. Depression of the error release key brings up EREL which resets the error flip-flop C174 whereupon the system is restored to its normal verify mode condition. The operator then actuates the data key which she knows (from looking at the source document and reading the memory position indicator) to be the correct key for the error-producing memory position. This triggers a normal verify character transfer cycle and if comparator C150 detects a state of equality between the stored character and the keyed character, no error condition is initiated, AND C148 resets the EC bit and the addressing circuits are incremented at TP6 whereupon the verify operation is permitted to continue in a normal fashion.

If on the retry, however, the operator again gets an error condition she then is sure that the character in the A register, which had been transferred from the memory, is incorrect and must be changed. To accomplish this the operator again actuates the error release key and while holding it depressed also actuates the correct key, simultaneously bringing up EREL and COR. The former signal resets the error flip-flop C174 as before and the latter signal activates AND D224 to set the correct flip-flop D254. This brings up CO and drops $\overline{CO}$. CO sets the entry flip-flop D262, resets the verify flip-flop D264 and sets the reverify flip-flop D266. The system is now conditioned to execute a single entry character transfer cycle. The operator actuates the proper data key to trigger the cycle and the new data character is entered into the addressed storage location in the memory. When END comes up at the end of the cycle, AND D206 is activated to reset the correct flip-flop D254. At the same time AND D206 activates OR D240 to set the verify flip-flop, bringing up VER which in turn triggers single-shot D223 to reset the entry flip-flop. This restores the system to the verify mode but the reverify flip-flop D266 remains set. It is to be noted that at TP3 of the single entry character transfer cycle, OR C136 was not activated to reset flip-flop C138 and thus at TP5 of the cycle AND A86 causes the transfer of a set EC bit into the memory along with the newly entered data character.

At the end of the verify operation the operator cannot go into a normal tape cycle since the release key is ineffective due to the fact that the low state of $\overline{REV}$ deconditions AND D214. Further, since REV is high AND D188 is activated at the end of the last character transfer cycle of the verify operation. The output of AND D188 sets the dup flip-flop C176 and also sets the check flip-flop D190. With END already high and DUP shifting high, OR E292 triggers a REGEN pulse to start a new character transfer cycle. Since the system is in the dup status, this new cycle proceeds as a dup-verify transfer cycle with the exception that ANDs C142, C144 and C146 are deconditioned by $\overline{CHK}$ so that all program data is ignored. The addressing circuits B108 thus step through the memory beginning with storage location 1 while AND C120 is conditioned to look for set EC bits.

The first set EC bit encountered will be that which was forced into the memory at the storage location of the first data character entered during the preceding verify cycle. When this storage location is reached, AND C120 generates the error signal and the system stops at that position. The operator then actuates the proper key to verify the new data character and, upon the generation of an equal signal from AND C148 flip-flop C138 is reset so that the EC bit in the A register is reset upon transfer of the data back to memory at TP5 of the cycle.

After this, the operator actuates the dup key to reinitiate the forced dup operation. The system will continue to dup through the memory until it encounters either another set EC bit or the end of the data block. When the end of the block is reached, AND D215 is activated at TP15 time of the last character transfer cycle. This sets flip-flop D260, bringing up TER which resets flip-flop D190 through OR D186. When END comes up at the very end of the final cycle, AND D248 sets flip-flop D268 to initiate the tape cycle. The positive shift in TAPE resets the flip-flops D266, D264 and D260.

If after making two or three consecutive single character corrections during a verify cycle it becomes apparent to the operator that the entire data field is incorrect, it is usually more expedient for her to perform a field modify correction by simultaneously actuating the error release and field modify keys, generating both EREL and FM. The former signal resets the error flip-flop C174 while the latter signal sets the dup flip-flop C176 and the flip-flop D258, which in turn sets flip-flops D256 and D266. FM also activates AND D194 to trigger BK1. This causes the system to dup its way backwards through the memory in exactly the same manner as described above for the field modify operation during entry mode. It is noted that AND C120 is at this time deconditioned by $\overline{EM}$ so that the detection of any set EC bits during backspacing does not trigger an error condition. When an MSD program bit is detected by AND C146 the resultant MS signal resets the dup flip-flop C176 and flip-flop D256. This brings $\overline{EM}$ high and triggers single-shot D218 to generate an output which sets the entry flip-flop D262 and resets the verify flip-flop D264. It is to be noted that while the verify flip-flop is here temporarily reset to allow entry of corrected data, the reverify flip-flop D266 remains set.

The operator then fills in the data field whereby the system is caused to execute a series of entry mode character transfer cycles.

At TP11 of the character transfer cycle during which the last new data character is entered AND C146 detects the MSD program bit and the resultant MS signal activates AND D212 to reset flip-flop D258. This brings $\overline{MOD}$ high whereupon single-shot D220 is triggered to set the verify flip-flop D264. This in turn triggers single-shot D223 to reset the entry flip-flop D262 whereupon the system is restored to the normal verify mode. Of course, when the end of the data block is reached the reverify flip-flop D266 is still set, inhibiting the operation of the release key. At this time AND D188 operates to set the check flip-flop D190 and the dup flip-flop C176 whereupon the system is run through a forced dup operation, as previously described, to rapidly reset the addressing circuits to the storage location containing the first newly entered data character.

The operator then proceeds to verify the newly entered data and thereafter actuates the dup key to automatically step the addressing circuits to the end of the data block whereupon a tape cycle is triggered.

It is to be noted that if the operator enters any new data by use of the correct key or the field modify key during a reverification cycle, OR D186 is activated to reset check flip-flop D190 so that the terminate flip-flop D260 cannot be set until after another reverification cycle is executed successfully (without the entry of any new data).

Operation—Tape Cycle

When TAPE shifts positive at the end of a successful verification or reverification cycle, gate B106 is opened to permit readout of the data block from memory matrix B100 to the tape unit. Also, TAPE triggers single-shot E300 which in turn triggers the REGEN signal to initiate a character transfer cycle. Since at this time $\overline{TAPE}$ is low AND circuits E310, E312, E314, E316, and E328 are deconditioned so that the only timing signals which are generated during the tape character transfer cycle are US at TP6, CLRA at TP9, RD and STR at TP10, and ATM, ATP and WR at TP13. This set of signals operates to read the data from each character storage location of the memory, starting at location number 1, and to recirculate it back to its position in memory through the A register. Each time a data character is transmitted on the output lines from the sense amplifiers in response to STR, it is gated through gate B106 to the tape unit where it is received and recorded on tape in any suitable manner.

Upon completion of the tape cycle OK is transmitted back to the control unit and operates to set the entry flip-flop D262 and to reset flip-flop D268 after a 1 TP-width delay imposed by delay circuit D252. The purpose for this delay is to keep AND E270 deconditioned to inhibit the use of the data keys long enough to permit the system to run through any automatic cycling that may be required by program data stored in storage location 1.

It will be appreciated that various changes in the form and details of the above-described preferred embodiment may be effected by persons of ordinary skill without departing from the true spirit and scope of the invention.

I claim:

1. In a manual-entry data recorder, the combination comprising:
- a keyboard having data keys;
- a buffer memory having a plurality of character storage locations;
- a first storage register;
- means operable in response to actuation of one of said data keys for loading a data character into said first storage register;
- means for comparing the contents of said first storage register with the contents of a predetermined storage location in said buffer memory and for thereafter transferring the contents of said first storage register into said predetermined storage location of said buffer memory;
- a control memory; and
- means for loading a first predetermined data bit into said control memory in response to an unequal comparison.

2. The data recorder set forth in claim 1 further comprising:
- selectively operable verification means for inhibiting said data transfer from said first storage register to said buffer memory, whereby the initial contents of said predetermined storage location are retained therein and are verified by said comparison operation.

3. The data recorder set forth in claim 2 wherein said verification means comprises:
- a second storage register;
- means for loading the initial contents of said predetermined storage location of said buffer memory into said second storage register for comparison with the contents of said first storage register; and
- means operable after said comparison for transferring the contents of said second storage register back into said predetermined storage location.

4. The data recorder set forth in claim 2 further comprising:
- automatic memory accessing means for addressing the next succeeding storage location in said buffer memory after each said comparison operation.

5. The data recorder set forth in claim 4 wherein said keyboard also contains special function keys and further comprising:
- duplication means operable in response to actuation of one of said special function keys during a time when said verification means is operable for causing said automatic memory accessing means to advance past a plurality of storage locations in said buffer memory;
- control means for scanning the data bits in said control memory corresponding to said storage locations in said buffer memory passed during operation of said duplication means and for generating a signal upon detection of a first predetermined data bit; and
- error means responsive to said signal for arresting said memory accessing means.

6. The data recorder set forth in claim 4 wherein said keyboard also contains special function keys and further comprising:
- skip means operable in response to actuation of one of said special function keys during a time when said verification means is operable for loading a predetermined data character into said first storage register and for causing said automatic memory accessing means to advance past a plurality of storage locations in said buffer memory, whereby the contents of each of said plurality of storage locations in said buffer memory are compared with said predetermined data character;
- error means responsive to an unequal comparison for arresting said memory accessing means; and
- control means for loading a second predetermined data bit into said control memory for each storage location in said buffer memory passed during operation of said skip means.

7. The data recorder set forth in claim 1 further comprising:
- automatic memory accessing means for addressing the next succeeding storage location in said buffer memory after each said transfer operation.

8. The data recorder set forth in claim 7 wherein said keyboard also contains special function keys and further comprising:
- duplication means operable in response to actuation of one of said special function keys for causing said automatic memory accessing means to advance past a plurality of storage locations in said buffer memory, whereby the contents of said storage locations remain unchanged; and
- control means for loading a second predetermined data bit into said control memory for each storage location in said buffer memory passed during the operation of said duplication means.

9. The data recorder set forth in claim 7 wherein said keyboard also contains special function keys and further comprising:
- skip means operable in response to actuation of one of said special function keys for loading a predetermined data character into said first storage register and for causing said automatic memory accessing means to advance past a plurality of storage locations in said buffer memory, whereby the contents of each of said plurality of storage locations in said buffer memory is compared with said predetermined data character;
- inhibit means operable during the operation of said skip means to inhibit said transfer operation, whereby the contents of said plurality of storage locations in said buffer memory remains unchanged; and
- control means for loading into said control memory a first predetermined data bit for each unequal comparison and a second predetermined data bit for each equal comparison that occurs during operation of said skip means.

10. In a manual-entry data recorder requiring manual verification of entered data prior to its recordation on a permanent record mediun, the combination comprising:
- a keyboard;
- a buffer memory having a plurality of character storage locations;
- means for entering a block of characters into said memory by actuation of keys on said keyboard;
- means operable after entry of said block for comparing the contents of successive memory locations with a succession of output signals from said keyboard to enable manual verification of said entered block of data; and
- a control memory for storing data bits representative of the results of said successive comparisons.

11. The data recorder set forth in claim 10 further comprising:
- error control means operable in response to an unequal comparison during said verification operation for providing an error indication;
- manually actuatable correction means conditioned for actuation by said error indication for connecting said keyboard to said buffer memory to permit entry of data characters thereinto; and
- means for entering a predetermined data bit into said control memory for each data character entered during actuation of said correction means.

12. The data recorder set forth in claim 11 further comprising:

means operable upon completion of verification of said block to automatically access the buffer memory storage location associated with the first said predetermined data bit entered into said control memory during said verification operation.

13. The data recorder set forth in claim 12 further comprising:

output means for transferring the contents of said buffer memory to an external utilization means for recordation on a permanent record medium;

release means for enabling manual initiation of the operation of said output means on completion of said verification operation; and blocking means operable in response to actuation of said correction means for blocking the operation of said release means.

14. The data recorder set forth in claim 13 further comprising:

reverification means operable in response to operation of said blocking means for requiring reverification of said block of data; and means operable upon completion of said reverification to disable said blocking means.

15. A data recorder comprising:

a keyboard having data keys and a release key;

a buffer memory;

recordation means operable in response to actuation of said release key to record the contents of said buffer memory on a record medium;

entry means constructed and arranged to load a block of data characters into said memory in response to actuation of one or more of said data keys and for simultaneously comparing the previous contents of said memory with said block of data characters;

verify means conditioned for operation upon completion of said memory loading operation and constructed and arranged to compare the data in said memory with data represented by actuation of one or more of said data keys; and means for blocking the operation of said release key during operation of said entry means and said verify means and for unblocking said release key upon completion of the operation of said verify means.

16. The data recorder set forth in claim 15 further comprising:

means for inhibiting the unblocking of said release key in response to an unequal comparison; and means for disabling said inhibiting means in response to an equal comparison upon a retry of said unequal comparison operation.

17. The data recorder set forth in claim 15 further comprising:

modification means conditioned for manual actuation during an unsuccessful verification cycle by occurrence of an unequal comparison for loading one or more data characters into said buffer memory;

means operable in response to manual actuation of said modification means for inhibiting the unblocking of said release key; and means for disabling said inhibiting means after verification of the data characters loaded during operation of said modification means.

18. In a manual-entry data recorder the combination comprising:

a keyboard;

a buffer memory;

output means for recording data stored in said buffer memory on a record medium;

entry means for loading data into said memory in response to actuation of keys on said keyboard;

verify means for comparing data stored in said memory with data represented by the actuation of keys on said keyboard;

interlock means for controlling the operation of said verify means and said output means to require the operation of the former as a condition to the operation of the latter; and duplication control means operable during operation of said verify means to provide an error indication in response to detection of data entered into said memory during the last preceding operation of said entry means which is not identical to data entered during an operation of said entry means previous to said last preceding operation.

19. In a manual-entry data recorder the combination comprising:

a keyboard;

a buffer memory;

output means for recording data stored in said buffer memory on a record medium;

entry means for loading data into said memory in response to actuation of keys on said keyboard;

verify means for comparing data stored in said memory with data represented by the actuation of keys on said keyboard;

interlock means for controlling the operation of said verify means and said output means to require the operation of the former as a condition to the operation of the latter; and skip control means operable during operation of said verify means to automatically compare selected data characters in said memory with a predetermined character code and to provide an error indication in response to an unequal comparison.

20. The data recorder set forth in claim 19 wherein said predetermined character code is representative of a space character.